United States Patent
Suzuki

(10) Patent No.: US 9,728,038 B2
(45) Date of Patent: Aug. 8, 2017

(54) BETTING TICKET INFORMATION PROVISION DEVICE, BETTING TICKET INFORMATION PROVISION METHOD, AND PROGRAM FOR BETTING TICKET INFORMATION PROVISION DEVICE

(71) Applicant: Rakuten, Inc., Tokyo (JP)

(72) Inventor: Shuhei Suzuki, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 206 days.

(21) Appl. No.: 14/430,271

(22) PCT Filed: Apr. 5, 2013

(86) PCT No.: PCT/JP2013/060444
§ 371 (c)(1),
(2) Date: Mar. 23, 2015

(87) PCT Pub. No.: WO2014/064952
PCT Pub. Date: May 1, 2014

(65) Prior Publication Data
US 2015/0221170 A1    Aug. 6, 2015

(30) Foreign Application Priority Data

Oct. 26, 2012    (JP) .................................. 2012-236260

(51) Int. Cl.
*A63F 9/24* (2006.01)
*G07F 17/32* (2006.01)
(Continued)

(52) U.S. Cl.
CPC ......... *G07F 17/3244* (2013.01); *G06Q 10/10* (2013.01); *G06Q 50/34* (2013.01); *G07F 17/326* (2013.01); *G07F 17/3288* (2013.01)

(58) Field of Classification Search
CPC ............. G07F 17/3288; G07F 17/3244; G07F 17/3204
See application file for complete search history.

(56) References Cited

U.S. PATENT DOCUMENTS

2004/0193531 A1* 9/2004 Amaitis ................ G06Q 40/04
705/37
2004/0235542 A1* 11/2004 Stronach ............... G06Q 30/06
463/6

(Continued)

FOREIGN PATENT DOCUMENTS

| JP | 2001-52097 A | 2/2001 |
| JP | 2002-133011 A | 5/2002 |
| JP | 2004-199479 A | 7/2004 |

OTHER PUBLICATIONS

International Search Report for PCT/JP2013/060444 dated Jun. 25, 2013.

*Primary Examiner* — Steve Rowland
(74) *Attorney, Agent, or Firm* — Sughrue Mion, PLLC

(57) ABSTRACT

A betting type of a betting ticket uniquely designating the order of arrival of one or more racers out of racers to participate in a race of a racing, a racer number pattern corresponding to the order of the racers in the betting type, and a receipt amount for the racer number pattern are received from a user (S2, S3), a betting type different from the received betting type is extracted (S6), a racer number pattern for the extracted betting type is extracted so as to cover all the received racer number patterns (S7), a first payout amount is calculated from odds information corresponding to the received betting type and racer number pattern and the receipt amount (S8), and an allotment amount to be allotted to the extracted racer number pattern is calculated so that the lowest second payout amount of second payout amount calculated from the odds information (Continued)

on the extracted betting type and racer number pattern becomes higher than an amount of money related to the first payout amount (S9).

9 Claims, 19 Drawing Sheets

(51) Int. Cl.
*G06Q 50/34* (2012.01)
*G06Q 10/10* (2012.01)

(56) References Cited

U.S. PATENT DOCUMENTS

| | | |
|---|---|---|
| 2005/0181868 A1* | 8/2005 | Vlazny ............... G07F 17/3288 463/28 |
| 2008/0207310 A1* | 8/2008 | Mindes ................. G06Q 10/00 463/25 |
| 2009/0088232 A1* | 4/2009 | Amaitis .............. G07F 17/3288 463/6 |
| 2010/0144428 A1* | 6/2010 | Fontaine ................ G06Q 50/34 463/28 |
| 2014/0155142 A1* | 6/2014 | Conroy ............... G07F 17/3288 463/25 |

* cited by examiner

FIG.6

| BRACKET NO. | HORSE NO. | HORSE NAME | BRACKET QUINELLA | BRACKET EXACTA | SEX・AGE | WEIGHT | QUINELLA | EXACTA | QUINELLA PLACE WIDE | TRIO | WIN ODDS | PLACE ODDS | POPULARITY |
|---|---|---|---|---|---|---|---|---|---|---|---|---|---|
| 1 | 1 | ・・・ | | | ・ | ・ | | | | | ・ | ・ ・ | ・ ・ |
| 2 | 2 | ・・・ | | | ・ | ・ | | | | | ・ | ・ ・ | ・ ・ |
| 4 | 3 | ・・・ | | | ・ | ・ | | | | | ・ | ・ ・ | ・ ・ |
| 4 | 4 | ・・・ | | | ・ | ・ | | | | | ・ | ・ ・ | ・ ・ |
| | 5 | ・・・ | | | ・ | ・ | | | | | ・ | ・ ・ | ・ ・ |

HORSE RACING

RACE PROGRESS STATUS | RACE CARD | ODDS | RESULT | PAYOUT

ODDS 1R 2R 3R 4R 5R 6R 7R 8R 9R 7R 2012/10/10 ●△RACECOURSE ・・・・
DIRT1,800m SUNNY, MUD, START TIME 15:55

BETTING CLOSE TIME 15:51

BET

HELLO A!
DEPOSIT  BET

ODDS
WIN/PLACE
RACE CARD
LIVE VIDEO

FIG.12

△○▽ HORSE RACING

| RACE PROGRESS STATUS | RACE CARD | ODDS | RESULT | PAYOUT |

2012/10/10  ●△RACECOURSE ・・・
7R  DIRT 1,800m  SUNNY, MUD, START TIME 15:55

EXACTA

ENTER PURCHASE AMOUNT

| FIRST PLACER HORSE NUMBER | SECOND PLACER HORSE NUMBER | PURCHASE AMOUNT |
|---|---|---|
| 5 | 1 | ¥200 |
| 5 | 3 | ¥100 |
| 5 | 6 | ¥100 |

HELLO A!

DEPOSIT

DECIDE AMOUNT — B7

△○▽HORSE RACING                                            HELLO A!

| RACE PROGRESS STATUS | RACE CARD | ODDS | RESULT | PAYOUT | (DEPOSIT) |

7R  2012/10/10  ●△RACECOURSE ・・・
DIRT 1,800m  SUNNY、MUD、START TIME 15：55

<CURRENT BUYING TARGET>  WIN 5

| HORSE NUMBER | PURCHASE AMOUNT | ODDS | PAYOUT AMOUNT |
|---|---|---|---|
| 5 | ￥1000 | 1.3 | ￥1300 |

TOTAL：￥1000

⬇

<VALUABLE INFORMATION>  WHEEL FROM EXACTA 5

| FIRST PLACE | SECOND PLACE | ODDS | PURCHASE AMOUNT | PAYOUT AMOUNT |
|---|---|---|---|---|
| 5 | 1 | 6.6 | ￥200 | ￥1320 |
| 5 | 2 | 13.1 | ￥100 | ￥1310 |
| 5 | 3 | 15.1 | ￥100 | ￥1510 |
| 5 | 4 | 14.7 | ￥100 | ￥1470 |
| 5 | 6 | 50.5 | ￥100 | ￥5050 |
| 5 | 7 | 88.3 | ￥100 | ￥8830 |
| 5 | 8 | 26.6 | ￥100 | ￥2660 |
| 5 | 9 | 91.1 | ￥100 | ￥9110 |
| 5 | 10 | 38.9 | ￥100 | ￥3890 |

TOTAL：￥1000

[CHANGE]  [RESERVE]

△○▽ HORSE RACING    HELLO A!

| RACE PROGRESS STATUS | RACE CARD | ODDS | RESULT | PAYOUT | (DEPOSIT) |

7R  2012/10/10  ●△RACECOURSE  ・・・
DIRT 1,800m  SUNNY、MUD、START TIME 15:55

<CURRENT BUYING TARGET>  TRIFECTA

| FIRST PLACE | SECOND PLACE | THIRD PLACE | ODDS | PURCHASE AMOUNT | PAYOUT AMOUNT |
|---|---|---|---|---|---|
| 5 | 1 | 3 | 8.6 | ¥500 | ¥4300 |
| 5 | 1 | 4 | 9.7 | ¥500 | ¥4850 |

TOTAL: ¥1000

⬇

<VALUABLE INFORMATION>  EXACTA 5-1

| FIRST PLACE | SECOND PLACE | ODDS | PURCHASE AMOUNT | PAYOUT AMOUNT |
|---|---|---|---|---|
| 5 | 1 | 5.5 | ¥900 | ¥4950 |

TOTAL: ¥900

[CHANGE] — B13   [RESERVE] — B14

FIG.17

△○▽ HORSE RACING     HELLO A!

| RACE PROGRESS STATUS | RACE CARD | ODDS | RESULT | PAYOUT | (DEPOSIT) |

7R   2012/10/10   ●△RACECOURSE ・・・
DIRT 1,800m SUNNY、MUD、START TIME 15:55

<CURRENT BUYING TARGET>    EXACTA 5-1

| FIRST PLACE | SECOND PLACE | ODDS | PURCHASE AMOUNT | PAYOUT AMOUNT |
|---|---|---|---|---|
| 5 | 1 | 5.0 | ¥1000 | ¥5000 |

TOTAL: ¥1000

⬇

<VALUABLE INFORMATION>    TRIFECTA

| FIRST PLACE | SECOND PLACE | THIRD PLACE | ODDS | PURCHASE AMOUNT | PAYOUT AMOUNT |
|---|---|---|---|---|---|
| 5 | 1 | 2 | 50.1 | ¥100 | ¥5010 |
| 5 | 1 | 3 | 55.7 | ¥100 | ¥5570 |
| 5 | 1 | 4 | 90.1 | ¥100 | ¥9010 |
| 5 | 1 | 6 | 88.7 | ¥100 | ¥8870 |
| 5 | 1 | 7 | 77.7 | ¥100 | ¥7770 |
| 5 | 1 | 8 | 99.9 | ¥100 | ¥9990 |
| 5 | 1 | 9 | 51.1 | ¥100 | ¥5110 |
| 5 | 1 | 10 | 70.0 | ¥100 | ¥7000 |
| 5 | 1 | 11 | 60.7 | ¥100 | ¥6070 |

TOTAL: ¥900

[CHANGE]   [RESERVE]

FIG.18

↶ ↷ ADDRESS http//····

△○▽HORSE RACING          HELLO A!

| RACE PROGRESS STATUS | RACE CARD | ODDS | RESULT | PAYOUT | (DEPOSIT) |

7R  2012/10/10  ●△RACECOURSE ···
DIRT 1,800m  SUNNY、MUD、START TIME 15：55

<CURRENT BUYING TARGET>   QUINELLA 1-4

| HORSE NUMBER | HORSE NUMBER | ODDS | PURCHASE AMOUNT | PAYOUT AMOUNT |
|---|---|---|---|---|
| 1 | 4 | 2.8 | ¥1000 | ¥2800 |

TOTAL：¥1000

⬇

<VALUABLE INFORMATION> BRACKET QUINELLA 1-3

| BRACKET NUMBER | BRACKET NUMBER | ODDS | PURCHASE AMOUNT | PAYOUT AMOUNT |
|---|---|---|---|---|
| 1 | 3 | 3.3 | ¥900 | ¥2970 |

TOTAL：¥900

[ CHANGE ]  B13
[ RESERVE ]  B14

FIG.19

BETTING TICKET INFORMATION PROVISION DEVICE, BETTING TICKET INFORMATION PROVISION METHOD, AND PROGRAM FOR BETTING TICKET INFORMATION PROVISION DEVICE

CROSS REFERENCE TO RELATED APPLICATIONS

This application is a National Stage of International Application No. PCT/JP2013/060444 filed Apr. 5, 2013, claiming priority based on Japanese Patent Application No. 2012-236260 filed Oct. 26, 2012, the contents of all of which are incorporated herein by reference in their entirety.

TECHNICAL FIELD

The present invention relates to the technical fields of betting ticket information provision device, betting ticket information provision methods, and programs for betting ticket information provision device for providing information on betting tickets for racings events.

BACKGROUND ART

In a race of a racing such as horse racing or bicycle racing, the order of arrival of racing targets (racers) such as horses or bicycles are predicted, and betting tickets in accordance with betting types and racer numbers are purchased. Since dividends are paid in accordance with the race results and odds, services for obtaining more dividends have been developed. For example, Patent Document 1 discloses a betting terminal device that extracts odds of betting types associated with betting numbers entered from acquired odds, and selects the highest betting type odds from among them.

CITATION LIST

Patent Document

Patent Document 1: JP 2001-052097 A

SUMMARY OF THE INVENTION

Problem to be Solved by the Invention

Patent Document 1 discloses that for a quinella "1-10," a bracket quinella "1-5" is presented, for example. Thus, it discloses the presentation of a betting ticket changed in betting type while maintaining the whole of the each correspondence relationship between racers, with the order of arrival of horse numbers, bracket numbers, or the like entered in no particular order. However, it is impossible to efficiently find a betting ticket with a high probability of obtaining a higher dividend while maintaining a prediction by a user because the betting type is changed under the constraint of maintaining all correspondence relationships between racers.

The present invention has been made in view of this problem, and has an object of providing information on a betting ticket with a high probability of obtaining a higher dividend while maintaining a prediction by a user, as an example of the problem.

Means for Solving the Problem

In order to solve the above problem, an aspect of the invention is characterized in that a betting ticket information provision device for providing information on a betting ticket for a racing includes: an odds information acquisition means that acquires odds information on a race of the racing; a reception means that receives from a user a betting type of a betting ticket uniquely designating the order of arrival of one or more racers out of racers to participate in the race, a racer number pattern of one or more racer numbers corresponding to the order of racers in the betting type, and a receipt amount received for the racer number pattern; a betting type extraction means that extracts a betting type different from the received betting type from among betting types of the betting ticket uniquely designating the order of arrival of the one or more racers; a racer number pattern extraction means that extracts a racer number pattern for the extracted betting type so as to cover all the received racer number patterns; a first payout amount calculation means that calculates one or more first payout amounts from the odds information corresponding to the betting type and the racer number pattern received by the reception means, and the receipt amount received by the reception means; an allotment amount calculation means that calculates an allotment amount to be allotted to the extracted racer number pattern so that the lowest second payout amount of one or more second payout amounts calculated from the odds information on the extracted betting type and the extracted racer number pattern becomes higher than an amount of money related to the calculated first payout amount; and an output means that outputs the extracted betting type, the extracted racer number pattern, and the calculated allotment amount only when the allotment amount is calculated by the allotment amount calculation means.

Thus, information on a betting ticket with a high probability of obtaining a higher dividend while maintaining a prediction by a user can be provided because in a betting type different from a received betting type, a racer number pattern for an extracted betting type is extracted so as to cover all received racer number pattern, and only when a second payout amount for a betting ticket of the extracted betting type and racer number pattern is higher than an amount of money related to a first payout amount of the received betting ticket, information on the extracted betting ticket is outputted. Further, information that is not unfavorable to a user can be reliably provided because a racer number pattern for an extracted betting type is extracted so as to cover all received racer number pattern.

In the betting ticket information provision device according to an aspect of the invention, the invention is further characterized in that the allotment amount calculation means further calculates the allotment amount so that the total of the allotment amount allotted to the extracted racer number pattern becomes less than or equal to the total of the received receipt amount.

In this case, information on a betting ticket with a high probability of obtaining a higher dividend while maintaining a prediction by a user can be provided even when an amount of money to be paid is lower because information on a betting ticket in which the total of the allotment amount allotted to the extracted racer number pattern is less than or equal to the total of the received receipt amount is outputted.

In the betting ticket information provision device according to an aspect of the invention, the invention is further characterized in that the racer number pattern extraction means extracts the racer number patterns so that the racer number pattern is increased in number; and the allotment amount calculation means calculates the allotment amounts so that the total of the allotment amounts allotted to the extracted racer number patterns becomes equal to the total of the received receipt amount, and the lowest second payout amount becomes higher than the calculated first payout amount.

In this case, information on a betting ticket with a high probability of obtaining a higher dividend while maintaining a prediction by a user at the same amount of money to be paid can be provided because information on a betting ticket in which the total of the allotment amounts allotted to the extracted racer number patterns is equal to the total of the received receipt amount, and the lowest second payout amount is higher than the first payout amount of the received betting ticket is outputted.

In the betting ticket information provision device according to an aspect of the invention, the invention is further characterized in that the racer number pattern extraction means extracts the racer number pattern so that the racer number pattern is decreased in number; and the allotment amount calculation means calculates the allotment amount so that the total of the allotment amount allotted to the extracted racer number pattern becomes equal to the total of the received receipt amounts, and the lowest second payout amount becomes higher than the highest first payout amount of the calculated one or more first payout amounts.

In this case, information on a betting ticket with a high probability of increasing a payout amount at the same amount of money to be paid and a high probability of obtaining a higher dividend while maintaining a prediction by a user can be provided because information on a betting ticket in which the total of the allotment amount allotted to the extracted racer number pattern is equal to the total of the received receipt amounts, and the lowest second payout amount is higher than the highest amount of the first payout amounts of the received betting ticket is outputted.

In the betting ticket information provision device according to an aspect of the invention, the invention is further characterized in that the allotment amount calculation means calculates the allotment amount so that the total of the allotment amount allotted to the extracted racer number pattern becomes lower than the total of the received receipt amount, and the lowest second payout amount becomes higher than the highest first payout amount of the calculated one or more first payout amounts.

In this case, information on a betting ticket with a high probability of increasing a payout amount even at a lower amount of money to be paid and a high probability of obtaining a higher dividend while maintaining a prediction by a user can be provided because information on a betting ticket in which the total of the allotment amount allotted to the extracted racer number pattern is lower than the total of the received receipt amount, and the lowest second payout amount is higher than the highest amount of the first payout amount of the received betting ticket is outputted.

The invention according to an aspect is characterized in that a betting ticket information provision device for providing information on a betting ticket for a racing includes: an odds information acquisition means that acquires odds information on a race of the racing; a reception means that receives from a user a betting type of a betting ticket designating one or more racers out of racers to participate in the race, a racer number pattern of one or more racer numbers corresponding to racers in the betting type, and a receipt amount received for the racer number pattern; a betting type extraction means that extracts a betting type different from the received betting type from among betting types of the betting ticket designating the racer; a racer number pattern extraction means that extracts a racer number pattern for the extracted betting type so as to cover all the received racer number patterns; a first payout amount calculation means that calculates one or more first payout amounts from the odds information corresponding to the betting type and the racer number pattern received by the reception means, and the receipt amount received by the reception means; an allotment amount calculation means that calculates an allotment amount to be allotted to the extracted racer number pattern so that the lowest second payout amount of one or more second payout amounts calculated from the odds information on the extracted betting type and the extracted racer number pattern becomes higher than an amount of money related to the calculated first payout amount; and an output means that outputs the extracted betting type, the extracted racer number pattern, and the calculated allotment amount only when the allotment amount is calculated by the allotment amount calculation means, in which the allotment amount calculation means calculates the allotment amount so that the total of the allotment amount allotted to the extracted racer number pattern becomes lower than the total of the received receipt amount, and the lowest second payout amount becomes higher than the highest first payout amount of the calculated one or more first payout amounts.

Thus, valuable information on a betting ticket with a high probability of increasing a payout amount even at an amount of money to be paid lower than the received amount of money and a high probability of obtaining a higher dividend while maintaining a prediction by a user can be provided because in a betting type different from the received betting type, a racer number pattern for an extracted betting type is extracted so as to cover all received racer number pattern, and information on a betting ticket in which the total of the allotment amount allotted to the extracted racer number pattern is lower than the total of the received receipt amount, and the lowest second payout amount is higher than the highest amount of the first payout amount of the received betting ticket is outputted.

In the betting ticket information provision device according to an aspect of the invention, the invention is further-characterized in that the reception means further receives a charge for providing information on the betting ticket; and the betting type extraction means changes the range of extraction of the betting type from among betting types of the betting ticket designating the racer, in accordance with the amount of the charge received by the reception means, and extracts a betting type different from the received betting type.

In this case, since the extraction range is changed in accordance with the amount of a received charge, processing load can be reduced due to the limited extraction range and also a restraining effect by charging.

In the betting ticket information provision device according to an aspect of the invention, the invention further includes: an odds information storage means that successively stores in a storage means odds information on a race of the racing; a reservation means that receives a reservation of purchase of either the betting type, racer number pattern, and receipt amount received by the reception means, or the betting type, racer number pattern, and allotment amount outputted by the output means; and a purchase processing means that performs purchase processing by the calculated allotment amount only when the allotment amount is calculated by the allotment amount calculation means, based on the acquired odds information, in which the odds information acquisition means refers to the storage means and acquires the odds information a predetermined time before the close of acceptance of betting tickets for the racing.

In this case, although it is not determined which of a betting ticket received from a user and an extracted betting ticket is more favorable when there is time until the close of acceptance because there is time until the odds are fixed, the system, upon receiving the purchase reservation, automatically determines which is more favorable immediately before the close, thereby eliminating the need for the user to monitor it. Further, when a payout amount of an extracted betting ticket becomes unfavorable due to a change in odds, purchase can be prevented.

The invention according to an aspect is characterized in that a betting ticket information provision method for a betting ticket information provision device that provides information on a betting ticket for a racing includes: an odds information acquisition step of acquiring odds information on a race of the racing; a reception step of receiving from a user a betting type of a betting ticket uniquely designating the order of arrival of one or more racers out of racers to participate in the race, a racer number pattern of one or more racer numbers corresponding to the order of racers in the betting type, and a receipt amount received for the racer number pattern; a betting type extraction step of extracting a betting type different from the received betting type from among betting types of the betting ticket uniquely designating the order of arrival of the one or more racers; a racer number pattern extraction step of extracting a racer number pattern for the extracted betting type so as to cover all the received racer number patterns; a first payout amount calculation step of calculating one or more first payout amounts from the odds information corresponding to the betting type and the racer number pattern received in the reception step, and the receipt amount received in the reception step; an allotment amount calculation step of calculating an allotment amount to be allotted to the extracted racer number pattern so that the lowest second payout amount of one or more second payout amounts calculated from the odds information on the extracted betting type and the extracted racer number pattern becomes higher than an amount of money related to the calculated first payout amount; and an output step of outputting the extracted betting type, the extracted racer number pattern, and the calculated allotment amount only when the allotment amount is calculated in the allotment amount calculation step.

The invention according to an aspect is further characterized in that a program for a betting ticket information provision device that provides information on a betting ticket for a racing causes a computer to function as: an odds information acquisition means that acquires odds information on a race of the racing; a reception means that receives from a user a betting type of a betting ticket uniquely designating the order of arrival of one or more racers out of racers to participate in the race, a racer number pattern of one or more racer numbers corresponding to the order of racers in the betting type, and a receipt amount received for the racer number pattern; a betting type extraction means that extracts a betting type different from the received betting type from among betting types of the betting ticket uniquely designating the order of arrival of the one or more racers; a racer number pattern extraction means that extracts a racer number pattern for the extracted betting type so as to cover all the received racer number patterns; a first payout amount calculation means that calculates one or more first payout amounts from the odds information corresponding to the betting type and the racer number pattern received by the reception means, and the receipt amount received by the reception means; an allotment amount calculation means that calculates an allotment amount to be allotted to the extracted racer number pattern so that the lowest second payout amount of one or more second payout amounts calculated from the odds information on the extracted betting type and the extracted racer number pattern becomes higher than an amount of money related to the calculated first payout amount; and an output means that outputs the extracted betting type, the extracted racer number pattern, and the calculated allotment amount only when the allotment amount is calculated by the allotment amount calculation means.

Effect of the Invention

According to the present invention, information on a betting ticket with a high probability of obtaining a higher dividend while maintaining a prediction by a user can be provided because in a betting type different from a received betting type, a racer number pattern for the extracted betting type is extracted so as to cover all received racer number pattern, and only when a second payout amount for a betting ticket of the extracted betting type and racer number pattern is higher than an amount of money related to a first payout amount of the received betting ticket, information on the extracted betting ticket is outputted.

BRIEF DESCRIPTION OF THE DRAWINGS

FIG. 6 is a schematic diagram illustrating an example of a race information webpage.

FIG. 12 is a schematic diagram illustrating an example of a webpage for designating amounts of money for racer number patterns.

FIG. 13 is a schematic diagram illustrating an example of a webpage for confirming information entered.

FIG. 15 is a schematic diagram illustrating an example of a valuable information webpage.

FIG. 17 is a schematic diagram illustrating an example of a valuable information webpage.

FIG. 18 is a schematic diagram illustrating an example of a valuable information webpage.

FIG. 19 is a schematic diagram illustrating an example of a valuable information webpage.

MODES FOR CARRYING OUT THE INVENTION

Hereinafter, an embodiment of the present invention will be described with reference to the drawings. The embodiment described below is an embodiment when the present invention is applied to a betting ticket information provision system.

[1. Outline of Configuration and Function of Betting Ticket Information Provision System]

First, the configuration and general function of a betting ticket information provision system according to an embodiment of the present invention will be described with reference to FIG. 1.

Figure 1:
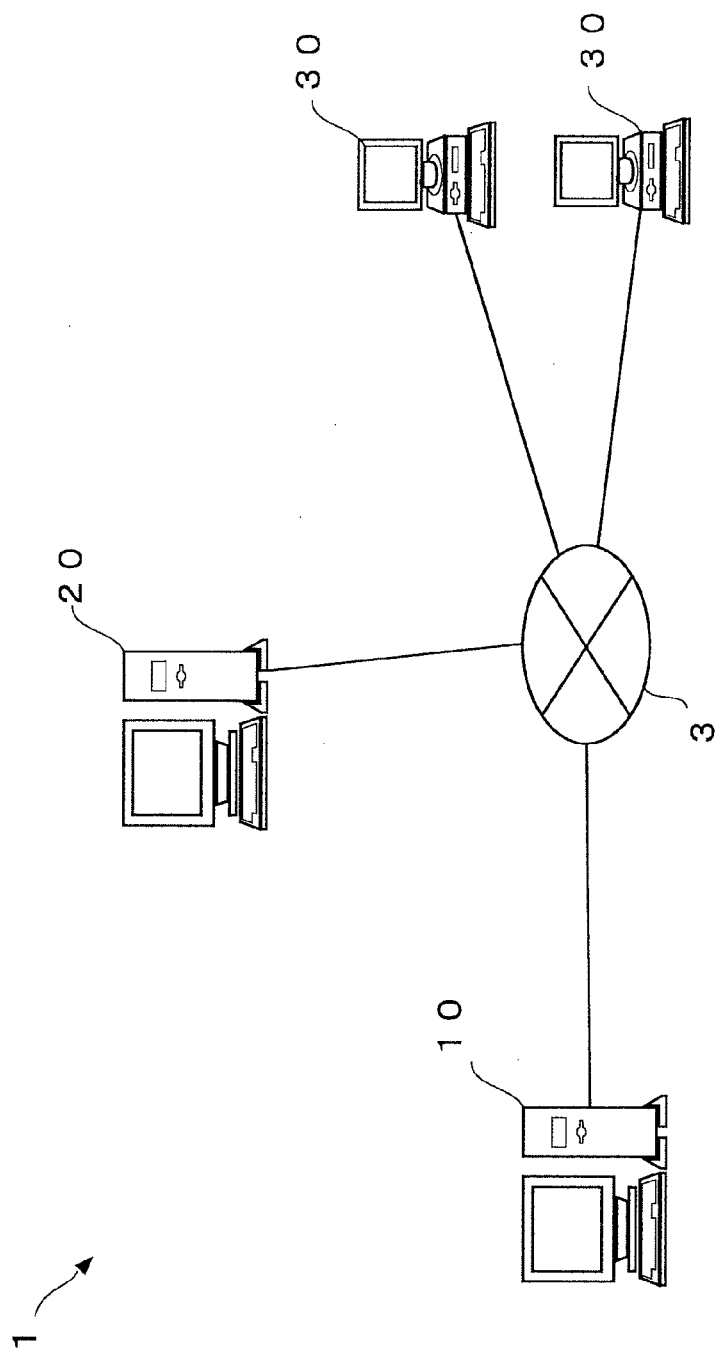
FIG. 1 is a schematic diagram illustrating a general configuration example of a betting ticket information provision system according to an embodiment of the present invention.

FIG. 1 is a schematic diagram illustrating a general configuration example of a betting ticket information provision system 1 according to this embodiment.

As shown in FIG. 1, the betting ticket information provision system 1 includes a betting ticket information provision server 10 (an example of abetting ticket information provision device) that provides information on betting tickets for racings events such as horse racing, bicycle racing, or speedboat racing, a host server 20 on the host side that hosts or operates the racings events and issues betting tickets, and terminal devices 30 for users to receive provision of information from the betting ticket information provision server 10 and purchase betting tickets on sporting events (races).

The betting ticket information provision server 10, the host server 20, and the terminal device 30 are connected by a network 3, and can transmit and receive data based on a communication protocol (for example, TCP/IP). The network 3 is constructed by the Internet, a private communication line (for example, community antenna television (CATV) line), a mobile communication network (including base stations and others), a gateway, and others, for example. Incidentally, the betting ticket information provision server 10 and the host server 20 may be connected by a private line to improve security.

The betting ticket information provision server 10 receives from the host server information announced by the host such as the odds of a race, the condition of a racecourse, information on racers such as horses, bicycles, or boats to participate in a race, and the result of a race. The betting ticket information provision server 10 outputs to the terminal devices 30 information to assist purchase of betting tickets by users at the terminal devices 30. The betting ticket information provision server 10 performs processing such as reception of purchase of betting tickets, and payout for a winning betting ticket to each terminal device 30. Thus, the betting ticket information provision server 10 is a server for operating a racing site such as a horse racing site.

Here, odds refer to a dividend rate (a rate on stakes), and include those successively announced as approximate odds before the start of a race, and those announced as fixed odds (final odds fixed finally) after the close of betting ticket sale. There are odds for each betting type of betting tickets that designate one or more racers out of racers to participate in a race (type of betting method, a so-called bet type), and for each racer number pattern. That is, there are odds for each betting ticket corresponding to a buying target of a betting type and a racer number pattern. Incidentally, racers in a race may include horse jockeys, or participants who control or steer bicycles or boats.

Examples of betting types of betting tickets designating one or more racers out of racers to participate in a race include win in which a racer predicted to finish first is designated, exacta in which racers predicted to finish first and second are designated in the correct order, trifecta in which racers predicted to finish first, second, and third are designated in the correct order, place in which a single racer predicted to finish first to third or first to second is designated, quinella in which two racers predicted to finish first to second are designated, bracket quinella in which brackets including racers predicted to finish first to second are designated, quinella place wide in which two racers predicted to finish first to third are designated, a trio in which three racers predicted to finish first to third are designated, and others.

Examples of betting types of betting tickets that uniquely designate the order of arrival of one or more racers out of racers to participate in a race include win, exacta, trifecta, and others. Examples of betting types that designate the order of arrival of racers in no particular order include quinella, bracket quinella, quinella place wide, trio, and others.

A racer number pattern includes, for a win, the number of a racer predicted to finish first, for an exacta, the numbers of racers predicted to finish first and second, for a trifecta, the numbers of racers predicted to finish first, second, and third, for a quinella, a combination of two designated racer numbers, for a bracket quinella, a combination of two designated bracket numbers (corresponding to the racer numbers of racers included in the brackets), for a quinella place wide, a combination of two designated racer numbers, for a trio, a combination of three designated racer numbers, and for a consecutive win, a single designated racer number.

The host server 20 performs processing of issuing betting tickets and processing of calculating odds based on issued betting tickets and announcing them to the betting ticket information provision server 10, terminal devices placed in a racecourse and a betting ticket office, and others.

There is a plurality of user terminal devices 30, which display information for purchasing betting tickets, and transmit information on betting tickets to be purchased to the betting ticket information provision server 10.

[2. Configuration and Function of Each Server]

(2.1 Configuration and Function of Betting Ticket Information Provision Server 10)

Next, the configuration and function of the betting ticket information provision server 10 will be described with reference to FIG. 2.

Figure 2:
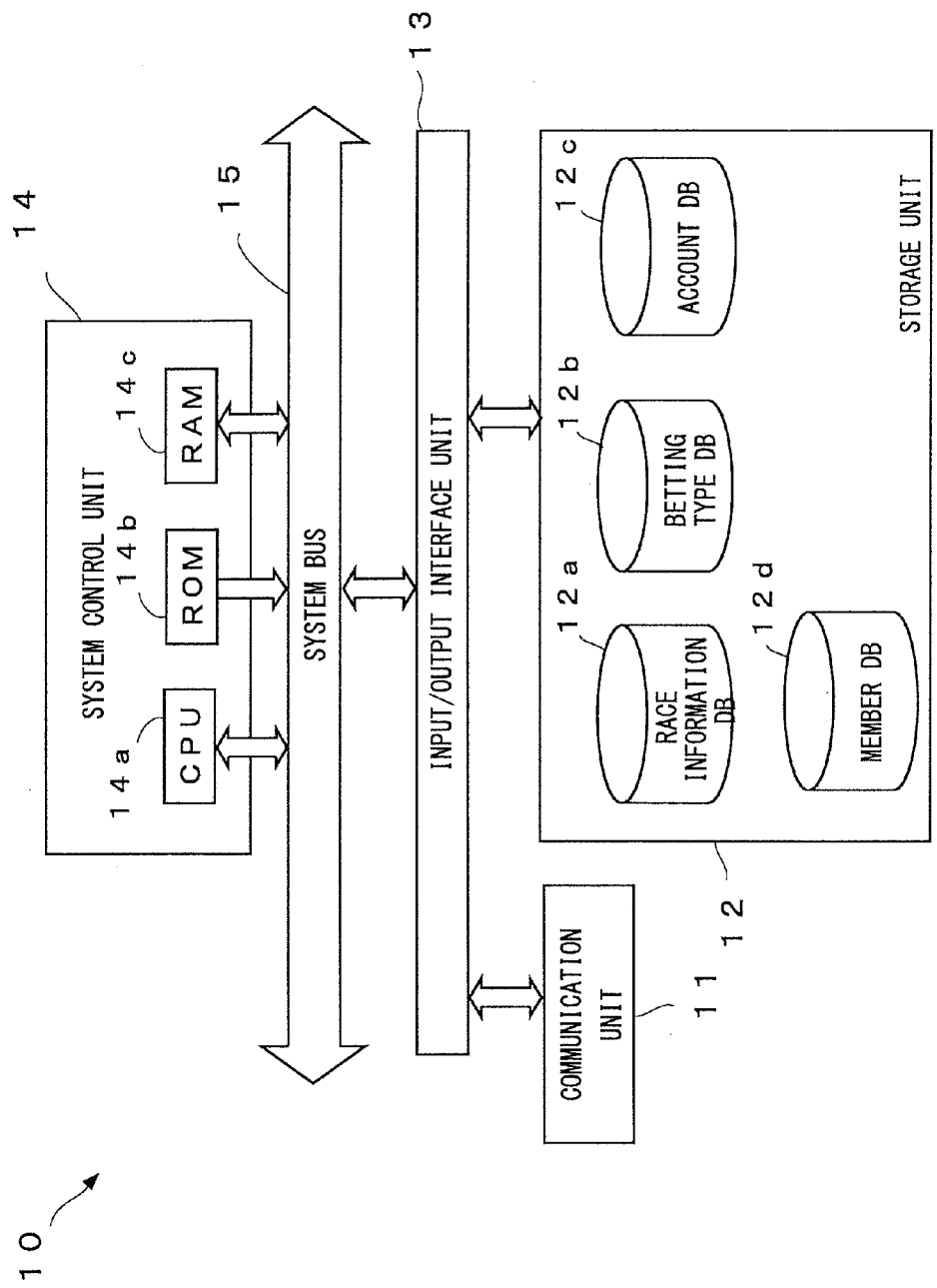
FIG. 2 is a block diagram illustrating an example of a general configuration of a betting ticket information provision server in FIG. 1.

FIG. 2 is a block diagram illustrating an example of a general configuration of the betting ticket information provision server 10.

As shown in FIG. 2, the betting ticket information provision server 10 functioning as a computer includes a communication unit 11, a storage unit 12, an input/output interface unit 13, and a system control unit 14. The system control unit 14 and the input/output interface unit 13 are connected via a system bus 15.

The communication unit 11 connects to the network 3 and controls the state of communication with the host server 20, the terminal devices 30, and others, and further connects to a local area network and performs transmission and reception of data to and from other servers on the local area network.

The storage unit 12 is formed by a hard disk drive or the like, for example, and stores various programs such as an operating system and a server program, screen data on webpages for presenting information on races to be provided to users, and others. Incidentally, the various programs may be acquired from other server devices or the like via the network 3, or may be recorded on recording media and read via a drive device (not shown), for example.

In the storage unit 12, a race information database 12a for storing race result information showing the results of races held in the past received from the host server 20 (hereinafter referred to as "race information DB 12a"), a betting type database 12b for classifying and storing betting types (hereinafter referred to as "betting type DB 12b"), an account database 12c for storing deposit information on funds for purchasing betting tickets received from users via the terminal devices 30 (hereinafter referred to as "account DB 12c"), a member database 12d for storing information on members (hereinafter referred to as "member DB 12d"), and others are constructed.

In the race information DB 12a (an example of a storage means), race information acquired from the host server 20 such as odds information and race results is stored in association with race IDs.

Here, examples of race information include, in addition to odds information, racecourse names, weathers at racecourses, race conditions such as the types of racecourses, such as whether racecourses are dirt or grass, the names of races to be held, the names, ages, and weights of horses to participate in races, the state of racers such as the types of bicycles or boats (including the names, ages, weights, and others of horse jockeys or bicycle or boat players), and others. Further, the race information includes information on final odds at the end of sale of betting tickets, the order in a race when the race is finished and the order is fixed, a time difference between the first and the second, and others.

Further, in the race information DB 12a, odds information on each betting type and on each racer pattern is stored in association with race IDs.

In the betting type DB 12b, betting types are classified and stored. For example, win, exacta, trifecta, and others are stored in the betting type of betting ticket that designates the order of racers, and quinella, bracket quinella, quinella place wide, trio, and others are stored in the betting type that designates racers in no particular order. In the betting type DB 12b, correspondence relationships between racer numbers and bracket numbers in accordance with the number of racers, or the like are stored.

In the account DB 12c, funds for users to purchase betting tickets are deposited, and the amounts are stored in association with user IDs. For example, a user determines a budget for betting tickets to purchase on a day when races are held, and transfers the amount of money by the budget from a bank on the Internet or the like to the account DB 12c by the terminal device 30 before buying a betting ticket. When a betting ticket wins, a payout is credited to the account DB 12c. When the user purchases a betting ticket, the amount of purchase is deducted from the balance of the user in the account DB 12c. Further, in the account DB 12c, an accumulated deposit amount as the accumulation of a deposit by a user from a bank or the like and a credit due to a payout is stored.

In the member DB 12d, user information on users registered as members (users of a horse racing site) such as user IDs, names, addresses, telephone numbers, e-mail addresses, occupations, hobbies, purchase histories, and subjects and categories of interest of the users, or the like are registered.

Further, in the member DB 12d, user IDs, login IDs, and passwords required for users to log in to the horse racing site from the terminal devices 30 are registered. Here, the login IDs and passwords are login information used for login processing (user authentication processing).

Further, in the storage unit 12, files or the like of webpages written in a markup language or the like such as Hypertext Markup Language (HTML) or Extensible Markup Language (XML) to allow information from the horse racing site to be displayed on the terminal devices 30 are stored.

The input/output interface unit 13 performs interface processing between the communication unit 11 and the storage unit 12, and the system control unit 14.

The system control unit 14 is constituted by a central processing unit (CPU) 14a, a read-only memory (ROM) 14b, and a random-access memory (RAM) 14c, or the like. The system control unit 14 performs processing for providing betting ticket information and others by the CPU 14a reading and executing various programs stored in the ROM 14b and the storage unit 12.

(2.2 Configuration and Function of Host Server 20)

Figure 3:
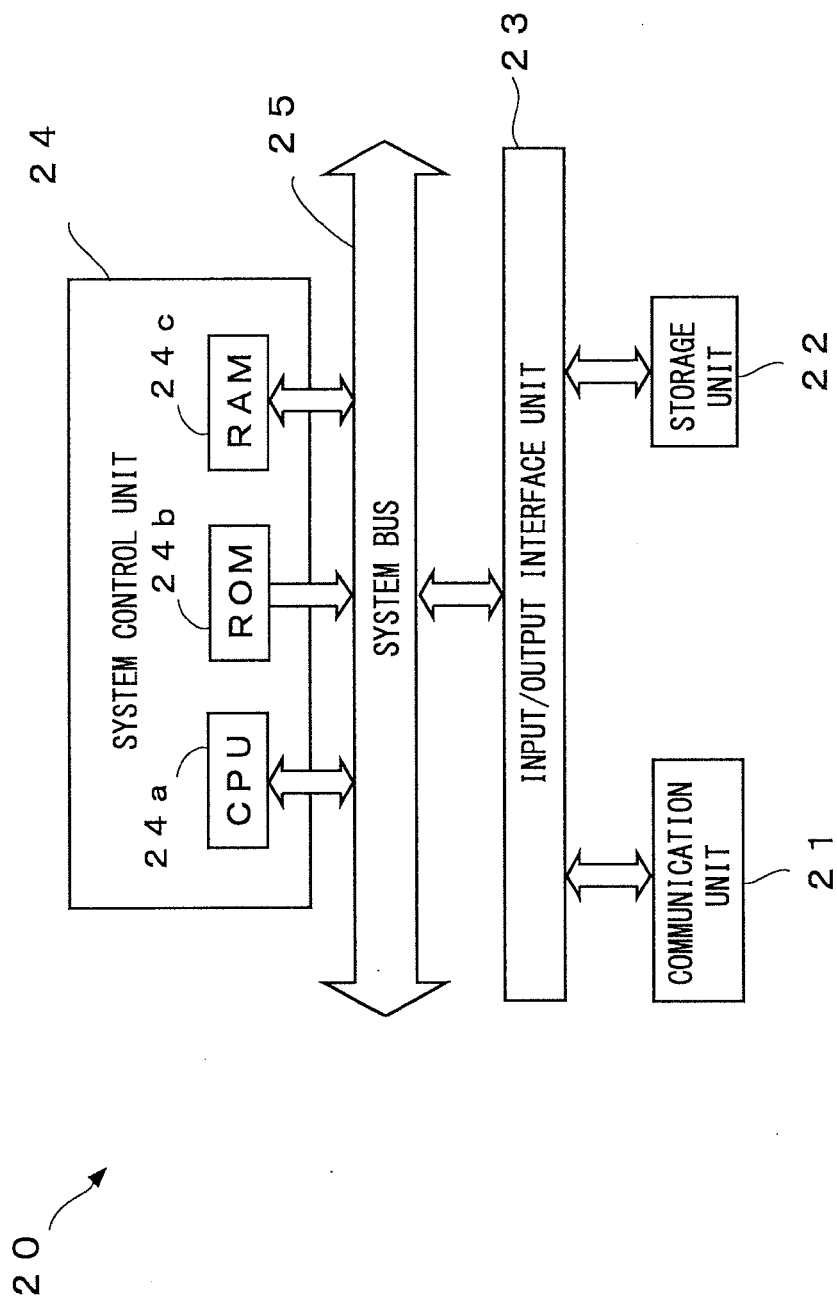
FIG. 3 is a block diagram illustrating an example of a general configuration of a host server in FIG. 1.

Next, the configuration and function of the host server 20 will be described with reference to FIG. 3. FIG. 3 is a block diagram illustrating an example of a general configuration of the host server 20.

As shown in FIG. 3, the host server 20 includes a communication unit 21, a storage unit 22, an input/output interface unit 23, and a system control unit 24, and the system control unit 24 and the input/output interface unit 23 are connected via a system bus 25. The configuration and function of the host server 20 are almost identical to the configuration and function of the betting ticket information provision server 10, and thus difference in each component and each function of the betting ticket information provision server 10 will be mainly described.

The communication unit 21 performs control of the state of communication with the terminal devices 30 and the betting ticket information provision server 10 through the network 3, the local area network, or the like, and others.

In the storage unit 22, information on races and the like are stored.

The system control unit 24 is constituted by a CPU 24a, a ROM 24b, and a RAM 24c, or the like. The system control unit 24 performs processing of transmitting odds information to the betting ticket information provision server 10 and others by the CPU 24a reading and executing various programs stored in the ROM 24b and the storage unit 22.

(2.3 Configuration and Function of Terminal Device 30)

Next, the configuration and function of the terminal devices 30 will be described with reference to FIG. 4.

Figure 4:
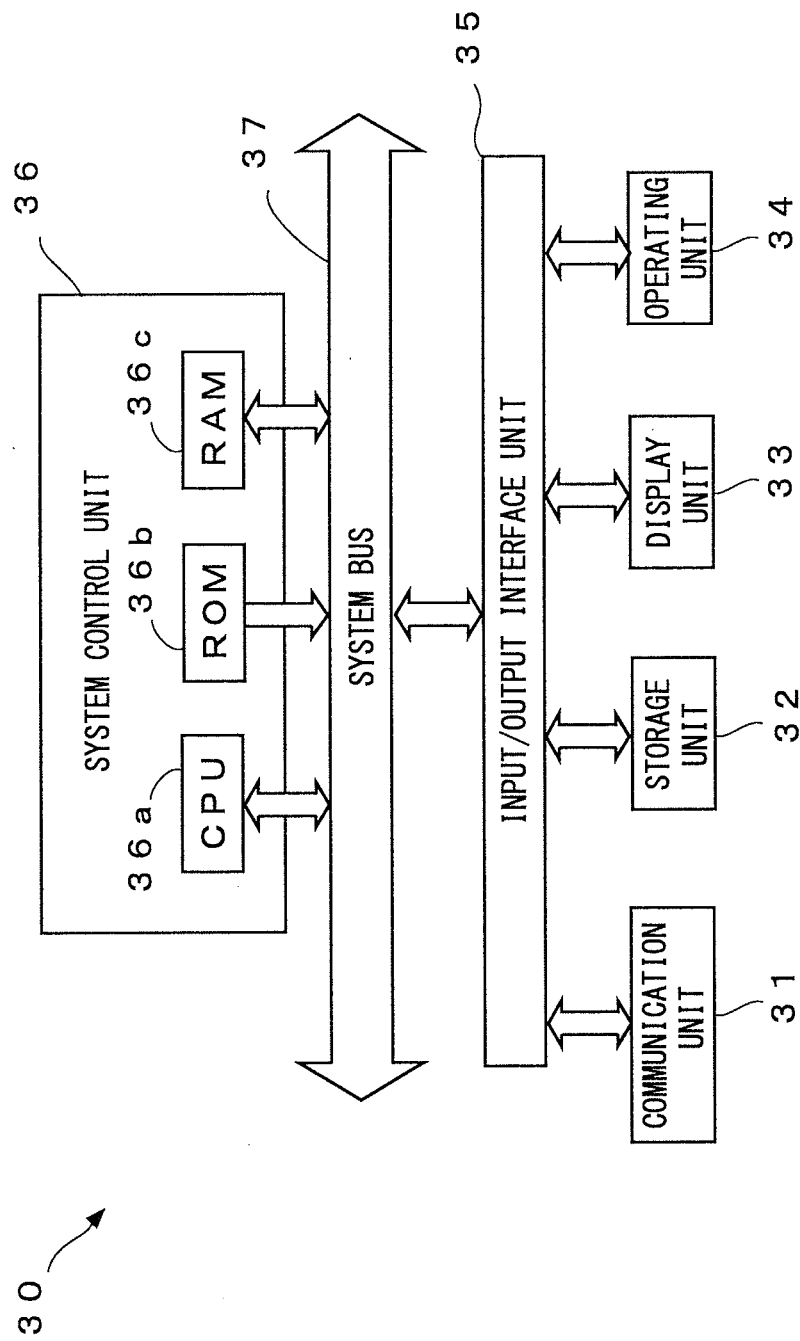
FIG. 4 is a block diagram illustrating an example of a general configuration of a terminal device in FIG. 1.

FIG. 4 is a block diagram illustrating an example of a general configuration of the terminal devices 30.

As shown in FIG. 4, a terminal device 30 functioning as a computer may be a personal computer, a portable wireless telephone such as a smartphone, or a mobile terminal such as a PDA, for example, and includes a communication unit 31, a storage unit 32, a display unit 33, an operating unit 34, an input/output interface unit 35, and a system control unit 36. The system control unit 36 and the input/output interface unit 35 are connected via a system bus 37.

The communication unit 31 controls communication with the betting ticket information provision server 10 and others through the network 3. When the terminal device 30 is a mobile terminal device, the communication unit 31 has a wireless communication function for connection to a mobile communication network in the network 3.

The storage unit 32 is made from a hard disk drive or the like, for example, and stores an operating system, a web browser program, a web browser tool bar program, and others.

The display unit 33 is constituted by a liquid crystal display device, an electro luminescence (EL) device, or the like, for example. On the display unit 33, a top page screen of a horse racing site or a webpage of a race information table for the purchase of a betting ticket on a specific race is displayed by a web browser.

The operating unit 34 is constituted by a keyboard and a mouse, or the like, for example. A user enters a response with the operating unit 34. When the display unit 33 is a touch switch type display panel such as a touch panel, the operating unit 34 acquires information on a location on the display unit 33 that the user contacts or comes close to.

The input/output interface unit 35 is an interface between the communication unit 31 and the storage unit 32, and the system control unit 36.

The system control unit 36 has a CPU 36a, a ROM 36b, and a RAM 36c, for example. In the system control unit 36, the CPU 36a reads and executes various programs stored in the ROM 36b, the RAM 36c, and the storage unit 32. For example, the system control unit 36 executes a web browser program, functioning as a web browser.

[3. Operation of Betting Ticket Information Provision System]

Next, an operation of the betting ticket information provision system 1 according to an embodiment of the present invention will be described with reference to FIGS. 5 to 19.

(3.1 Acquisition of Race Information)

First, an operation of the betting ticket information provision server 10 successively receiving race information from the host server 20 will be described.

The host server 20 successively transmits race information to the betting ticket information provision server 10. Specifically, the system control unit 24 of the host server 20 transmits, through the communication unit 21, race information such as odds information on each betting ticket that varies depending on the sales status of betting tickets, together with a race ID identifying a race, at predetermined time intervals, for example, while the race is being held, to the betting ticket information provision server 10. Incidentally, the system control unit 24 of the host server 20 may transmit race information to the betting ticket information provision server 10 at irregular intervals, instead of predetermined time intervals, or may transmit race information to the betting ticket information provision server 10 in response to a request from the betting ticket information provision server 10. Incidentally, the system control unit 24 of the host server 20 may transmit odds information to the betting ticket information provision server 10 each time the odds are updated.

Next, the betting ticket information provision server 10 successively receives the race information from the host server 20. Specifically, the system control unit 14 of the betting ticket information provision server 10 successively receives the race information successively transmitted from the host server 20 through the communication unit 11.

Next, the betting ticket information provision server 10 stores the race information in the race information DB 12a. Specifically, the system control unit 14 of the betting ticket information provision server 10 stores the race information in the race information DB 12a in association with the race ID for accumulation and update. Thus, the latest race information is stored in the race information DB 12a.

Thus, the betting ticket information provision server 10 functions as an example of an odds information storage means that successively stores odds information on a race of the racing in a storage means.

(3.2 Display of Race Information)

Next, display of race information will be described with reference to FIGS. 5 and 6.

Figure 5:
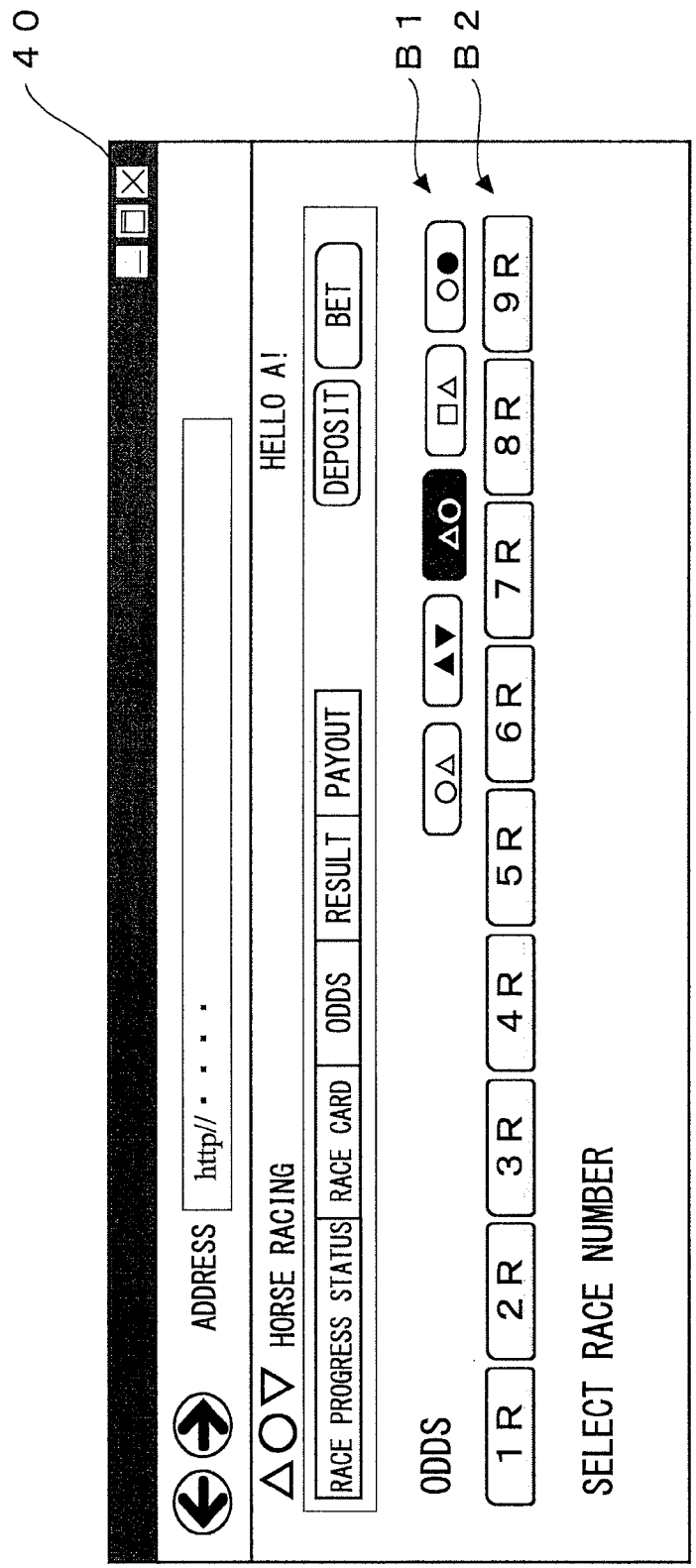
FIG. 5 is a schematic diagram illustrating an example of a webpage for requesting race information.

FIG. 5 is a schematic diagram illustrating an example of a webpage for requesting race information. FIG. 6 is a schematic diagram illustrating an example of a race information webpage.

A user logs in to a horse racing site provided by the betting ticket information provision server 10 to bet on a race. The terminal device 30 transmits login information entered to the betting ticket information provision server 10, receives information on a webpage of the horse racing site, and displays it on the display unit 33. In order to collect information necessary for the purchase of a betting ticket, the user selects a racecourse in which a race is held on the webpage or does something like that, accessing information, and as shown in FIG. 5, a webpage 40 for requesting race information is displayed on the display unit 33 of the terminal device 30.

When the user taps or clicks a racecourse "Δ◯" button B1 on the webpage 40, race number buttons B2 are displayed on the webpage 40. Then, when the user taps or clicks a race number button B2 (for example, a seventh race button "R7") on the webpage 40 in order to view a race information table of the race number in the racecourse "Δ◯," a webpage 41 of race information such as an odds table or a race card is displayed as shown in FIG. 6. When a race number button B2 is selected, a race ID corresponding to the race number is transmitted from the terminal device 30 to the betting ticket information provision server 10.

(3.3 Purchase of Betting Ticket)

Next, purchase of a betting ticket will be described with reference to FIGS. 7 to 13.

Figure 7:
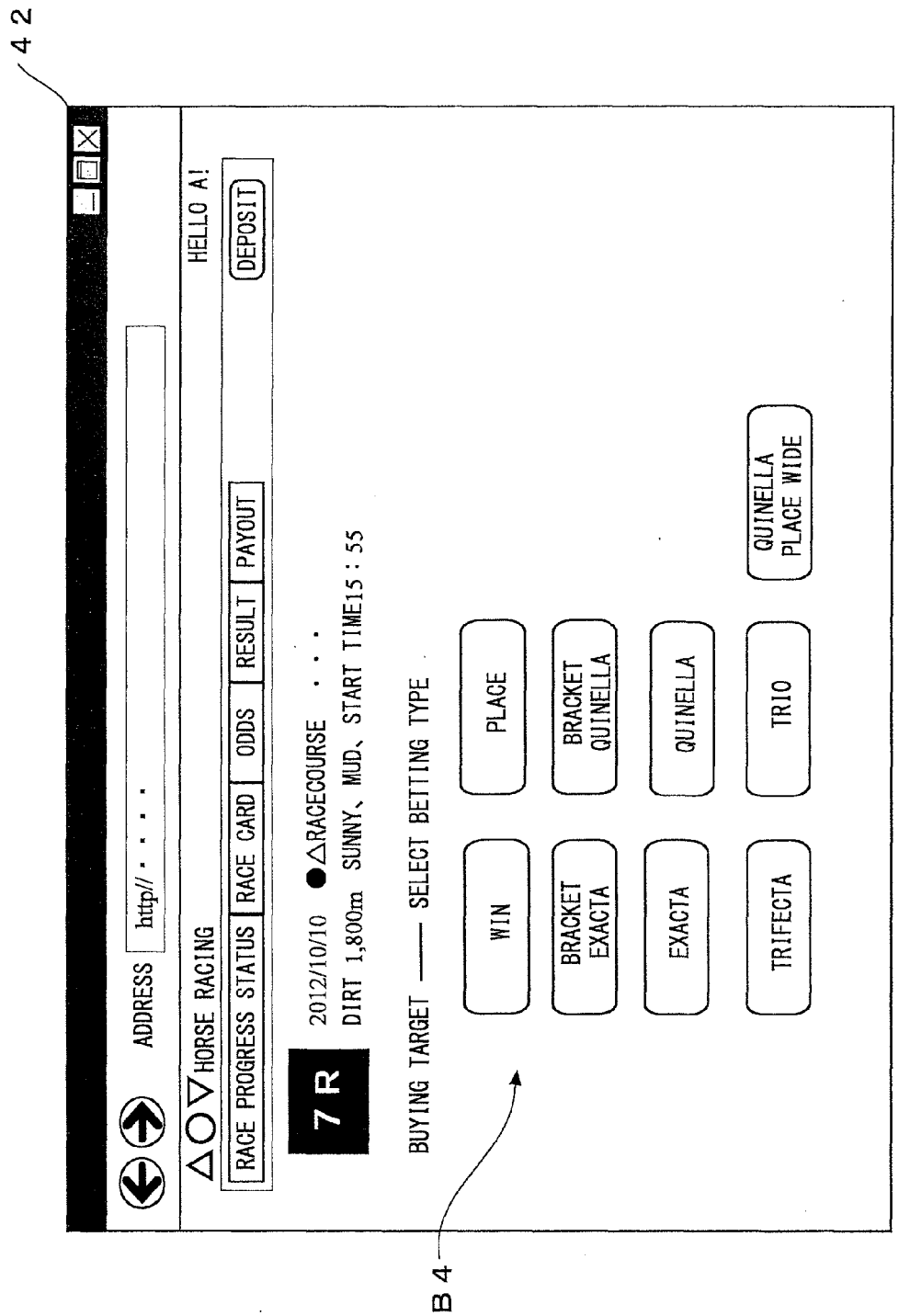
FIG. 7 is a schematic diagram illustrating an example of a webpage for selecting a betting type.
Figure 8:
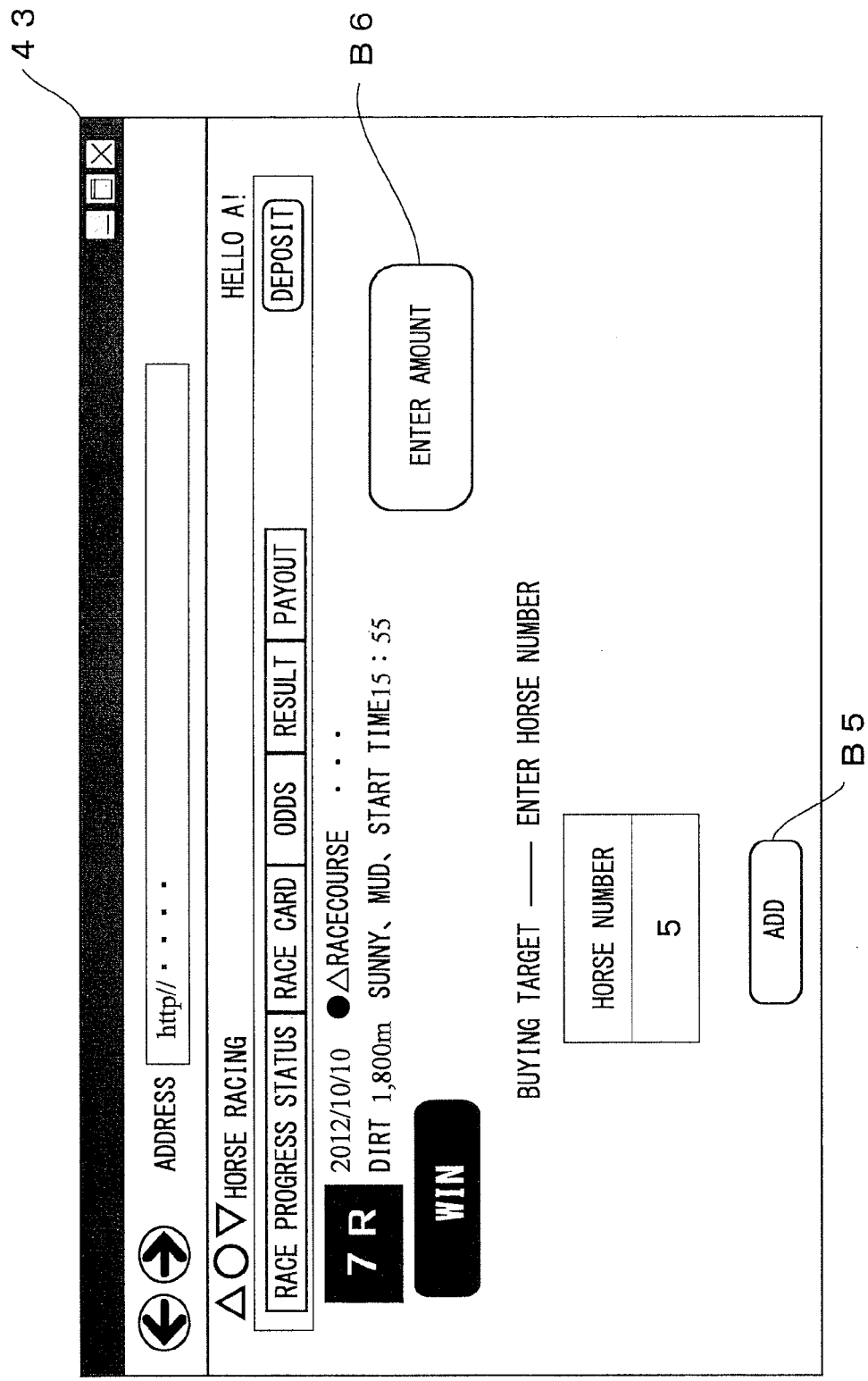
FIG. 8 is a schematic diagram illustrating an example of a webpage for designating a racer number pattern.
Figure 9:
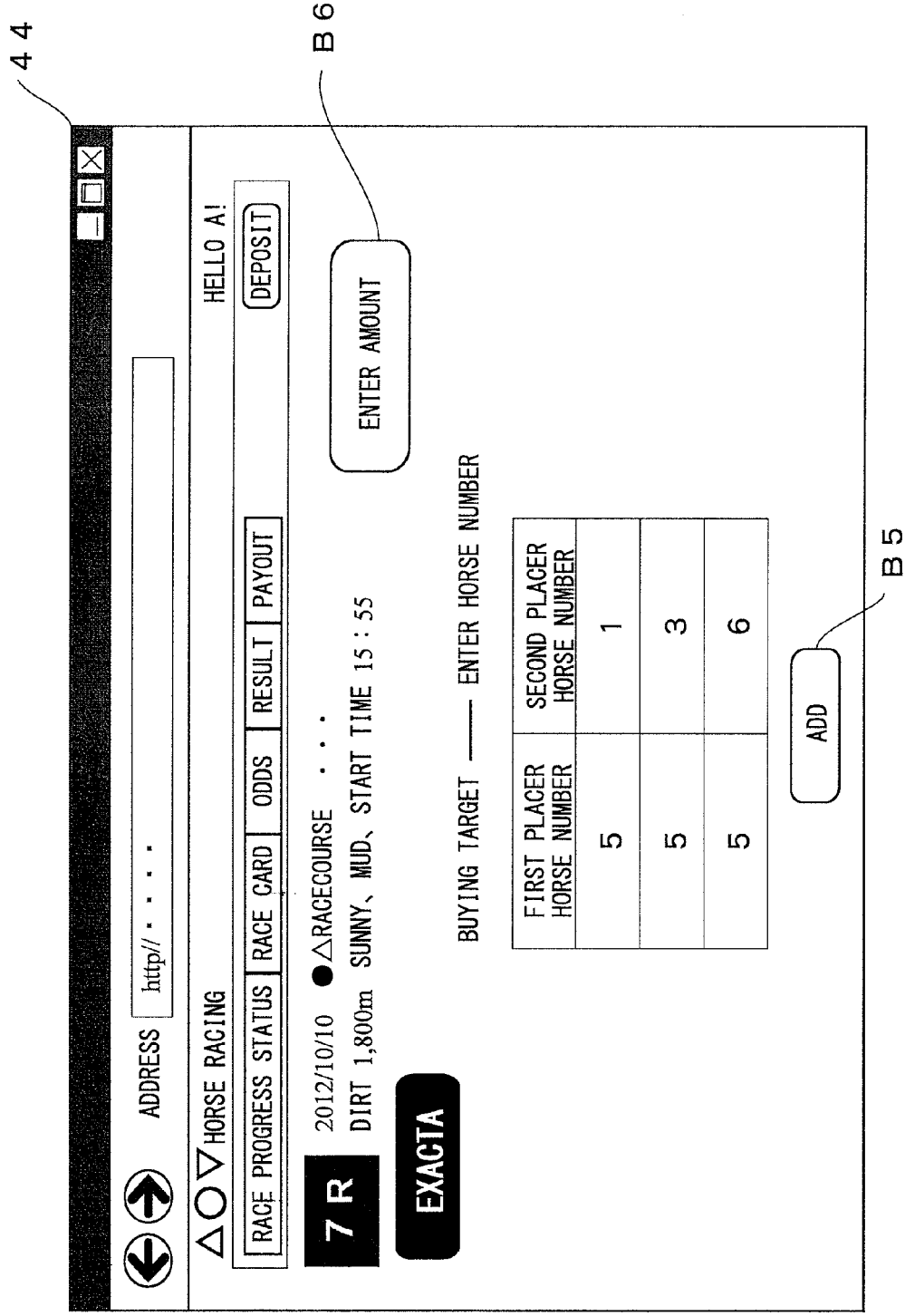
FIG. 9 is a schematic diagram illustrating an example of a webpage for designating a racer number pattern.
Figure 10:
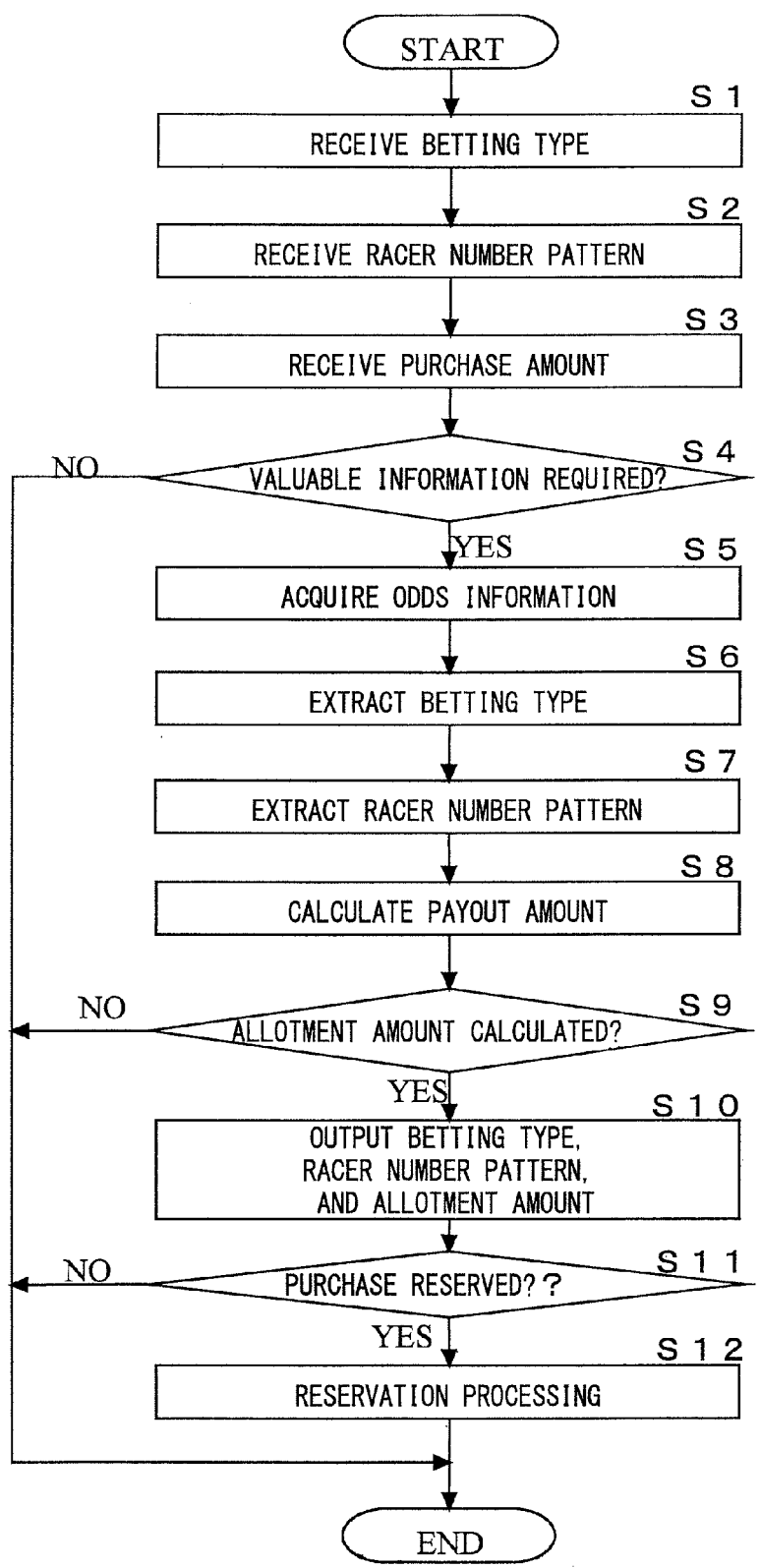
FIG. 10 is a flowchart illustrating an operation example of the betting ticket information provision server in FIG. 1.
Figure 11:
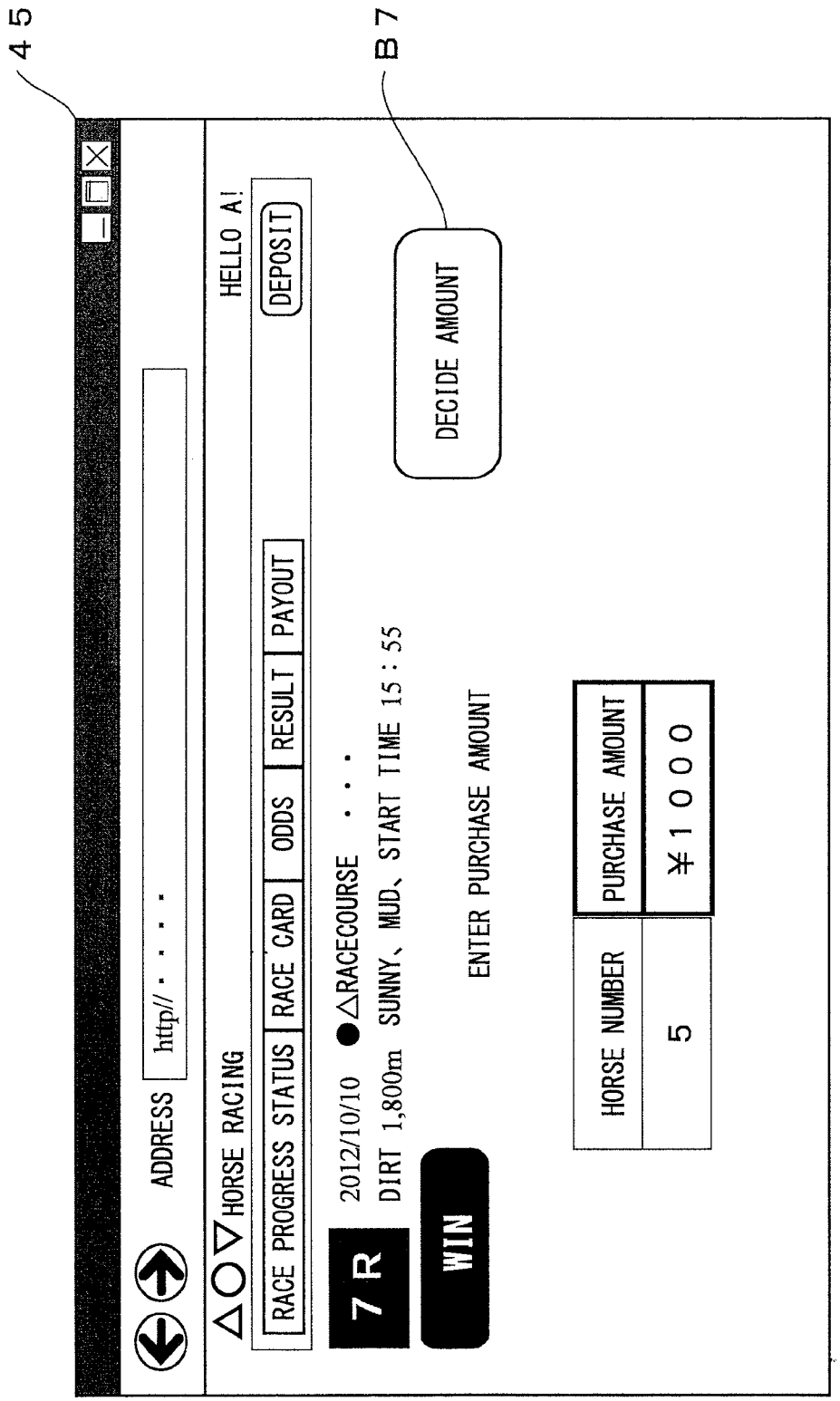
FIG. 11 is a schematic diagram illustrating an example of a webpage for designating an amount of money for a racer number pattern.
Figure 13:
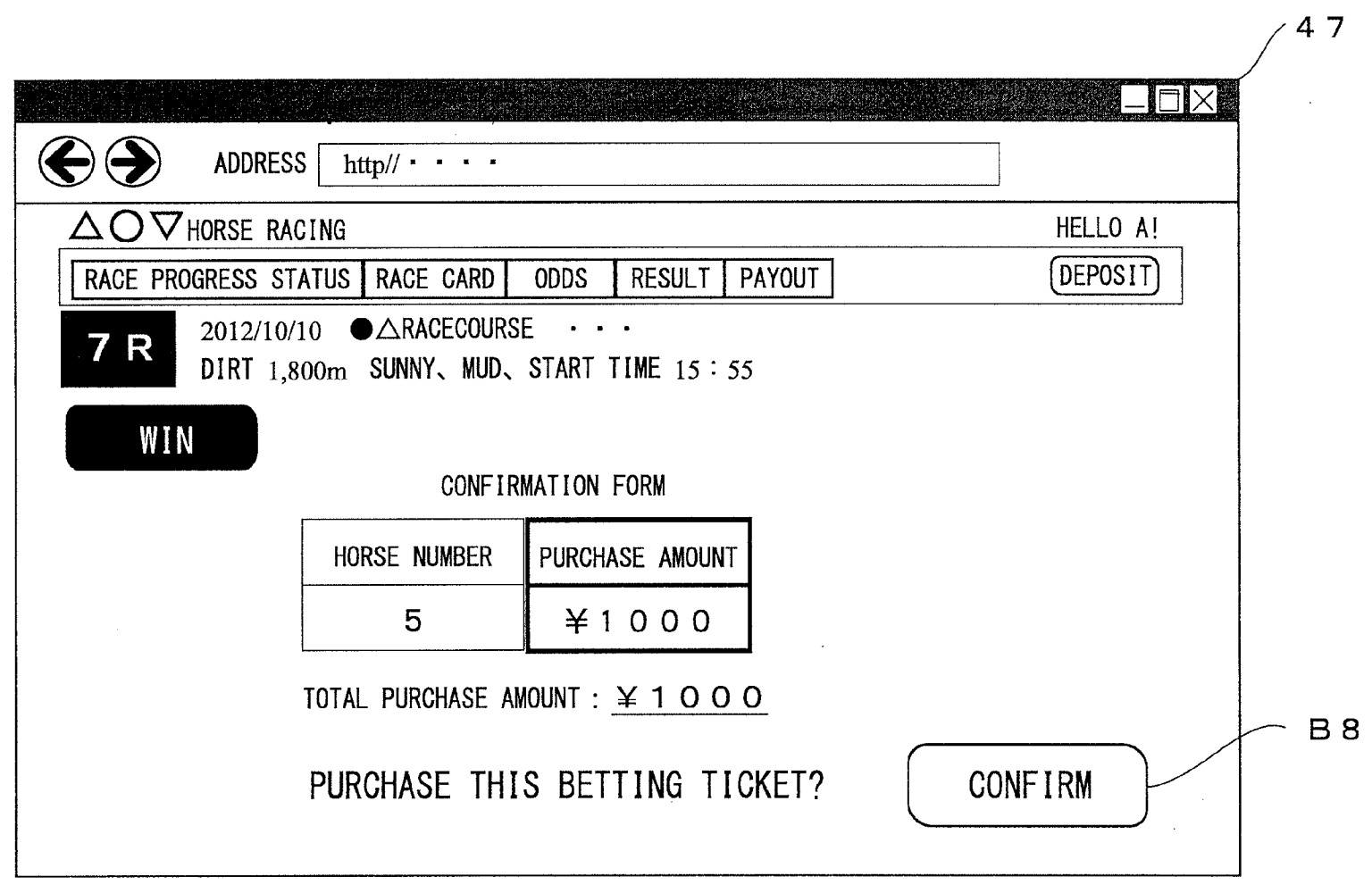

FIG. 7 is a schematic diagram illustrating an example of a webpage for selecting a betting type. FIGS. 8 and 9 are schematic diagrams each illustrating an example of a webpage for designating a racer number pattern. FIG. 10 is a flowchart illustrating an operation example of the betting ticket information provision server. FIGS. 11 and 12 are schematic diagrams each illustrating an example of a webpage for designating an amount of money for a racer number pattern. FIG. 13 is a schematic diagram illustrating an example of a webpage for confirming information entered.

First, a user deposits money necessary for the purchase of betting tickets in advance in a horse racing site. For example, as a budget for betting tickets to be purchased for races held today, the user previously deposits funds for purchasing betting tickets in his or her account opened in the betting ticket information provision server 10 before purchasing a betting ticket. The user logs in to the horse racing site of the betting ticket information provision server 10 from the terminal device 30, and performs a deposit procedure. The betting ticket information provision server 10 performs login processing, referring to the member DB 12d, and receives the deposit. Then, the betting ticket information provision server 10 stores deposit information in an account corresponding to a user ID in the account DB 12c. Incidentally, a deposit procedure may be performed for each race upon looking at the state of each race.

After the deposit is received, the user makes a consideration to purchase a betting ticket, based on a race information table, for example, and upon determination of a betting ticket to be purchased, taps or taps or clicks a bet button B3 on the webpage 41. When the bet button B3 is tapped or clicked, as shown in FIG. 7, a webpage 42 for selection of a betting type is displayed on the display unit 33. Incidentally, when the bet button B3 is tapped or clicked, a race ID corresponding to a race number may be transmitted again from the terminal device 30 to the betting ticket information provision server 10.

Then, on the webpage 42, together with the race number, betting type buttons B4 in a buying target are displayed. When the user selects a betting type button B4 by tapping or clicking, information on the selected betting type is transmitted from the terminal device 30 to the betting ticket information provision server 10.

After the user taps or clicks the betting type button B4, as shown in FIG. 8 or 9, a webpage 43 or a webpage 44 for designating a racer number pattern is displayed on the display unit 33. FIG. 8 shows the webpage 43 when a betting type button B4 of "win" is selected. FIG. 9 shows the webpage 44 when a betting type button B4 of "exacta" is selected.

Next, as shown in FIG. 10, the betting ticket information provision server 10 receives a betting type (step S1). Specifically, the system control unit 14 of the betting ticket information provision server 10 receives information on a betting type selected by the user from the terminal device 30.

Thus, the betting ticket information provision server 10 functions as an example of a reception means that receives from a user a betting type of a betting ticket uniquely designating the order of arrival of one or more racers out of racers to participate in the race. Further, the betting ticket information provision server 10 functions as an example of a reception means that receives from the user a betting type of a betting ticket designating one or more racers out of the racers to participate in the race.

Next, the betting ticket information provision server 10 receives a racer number pattern (step S2). Specifically, the system control unit 14 receives from the terminal device 30 information on a racer number (racer number pattern) entered by the user on the webpage 43 or the webpage 44.

For example, when the betting type is "win," the user enters the horse number (for example, "5") of a racer that he or she predicts to finish first (the so-called favorite) in a horse number entry field as an example of a racer number pattern on the webpage 43. When a rival horse with a high probability of beating the favorite or the like is purchased, an add button B5 on the webpage 43 is selected to add a horse number entry field. When horse number entry is finished and an enter amount button B6 is selected on the webpage 43, the terminal device 30 transmits information on the racer number pattern to the betting ticket information provision server 10.

When the betting type is "exacta," the user enters the horse numbers (for example, the first placer horse number "5" and the second placer horse number "1") of racers that he or she predicts to finish first and second in a horse number entry field as an example of a racer number pattern on the webpage 44. When the user wants to purchase an additional order combination, the user selects an add button to add a horse number entry field, and enters the horse numbers (for example, "5" and "3" or the like) of racers that he or she predicts to finish first and second in the horse number entry field. When horse number entry is finished and an enter amount button B6 is selected on the webpage 44, the terminal device 30 transmits information on the racer number patterns to the betting ticket information provision server 10.

After the user taps or clicks the enter amount button B6, as shown in FIG. 11 or 12, a webpage 45 or a webpage 46 for designating an amount of money for the racer number pattern is displayed on the display unit 33. FIG. 11 shows the webpage 45 for designating an amount of money for the racer number pattern in the betting type "win." On the webpage 45, an amount entry field for the racer number pattern is displayed. FIG. 12 shows the webpage 46 for designating amounts of money for the racer number patterns in the betting type "exacta." On the webpage 46, an amount entry field for each racer number pattern is displayed.

Thus, the betting ticket information provision server 10 functions as an example of a reception means that receives from a user a racer number pattern of one or more racer numbers corresponding to the order of racers in a betting type. Further, the betting ticket information provision server 10 functions as an example of a reception means that receives from a user a racer number pattern of one or more racer numbers each corresponding to a racer in a betting type.

Next, the betting ticket information provision server 10 receives a purchase amount (step S3). Specifically, the system control unit 14 receives from the terminal device 30 information on a purchase amount (receipt amount) for the racer number pattern entered by the user on the webpage 45 or the webpage 46.

For example, when the betting type is "win," on the webpage 45, as an example of a receipt amount, a purchase amount for the racer number pattern (for example, "¥1000") is entered in the amount entry field. When the amount entry is finished and a decide amount button B7 is selected on the webpage 45, the terminal device 30 transmits information on the receipt amount to the betting ticket information provision server 10.

When the betting type is "exacta," on the webpage 46, as an example of a receipt amount, a purchase amount for each racer number pattern (for example, "¥200" for 5-1, ¥100 for 5-3, and ¥100 for 5-6) is entered in the amount entry field. When the amount entry is finished and a decide amount button B7 is selected on the webpage 46, the terminal device 30 transmits information on the receipt amounts to the betting ticket information provision server 10.

After the user taps or clicks the decide amount button B7, as shown in FIG. 13, a webpage 47 for confirming the entered information is displayed on the display unit 33. When the user confirms the betting ticket to purchase, and taps or clicks a confirm button B8, the terminal device 30 transmits information to the effect that the betting ticket is confirmed to the betting ticket information provision server 10.

Thus, the betting ticket information provision server 10 functions as an example of a reception means that receives from a user a receipt amount received for a racer number pattern.

(3.4 Display of Valuable Information)

Figure 14:
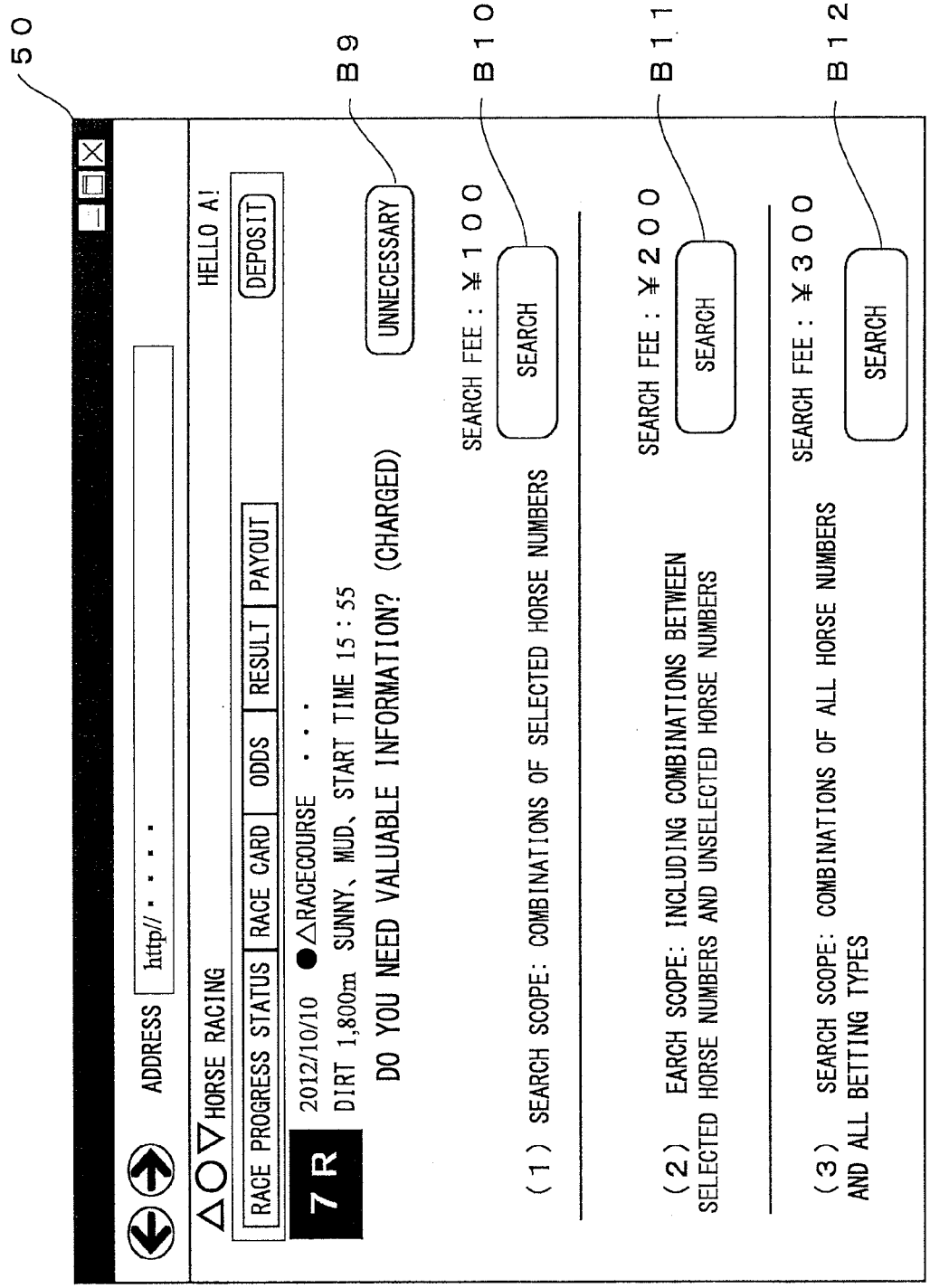
FIG. 14 is a schematic diagram illustrating an example of a webpage for selecting the scope of search.

Next, display of valuable information for a user will be described with reference to FIGS. 14 to 19. FIG. 14 is a schematic diagram illustrating an example of a webpage for selection of the scope of search. FIGS. 15 to 19 are schematic diagrams illustrating examples of valuable information webpages.

First, when the user taps or clicks the confirm button B8 on the webpage 47, a webpage 50 for selection of the scope of search for valuable information (information valuable to the user) is displayed on the display unit 33. On the webpage 50, as the scope of search, (1) a valuable information search only from combinations of selected horse numbers, (2) a valuable information search from the scope including combinations between selected horse numbers and unselected horse numbers, and (3) a valuable information search from combinations of all horse numbers and all betting types regardless of whether they are selected or unselected by the user, are displayed.

For the search scope in which valuable information is searched for only from combinations of selected horse numbers, for example, when there are fifteen horses and a quinella "1-4," that is, a betting ticket on horses predicted to finish first to second (horse number "1" and horse number "4") is going to be purchased, a betting ticket for a bracket quinella "1-3" in which the same horse numbers are included is in the search scope. When a betting ticket for a bracket quinella "1-3" is going to be purchased, betting tickets for a quinella "1-4" and a quinella "1-5" is in the search scope.

For the search scope in which valuable information is searched for from the scope including combinations between selected horse numbers and unselected horse numbers, for example, when a betting ticket for a win "3" is going to be purchased, a betting ticket for an "exacta wheel 3-all" is in the search scope. When a betting ticket for an exacta "5-1," an exacta "5-3," and an exacta "5-3" is going to be purchased, a betting ticket for a win "5" is in the search scope.

For the search scope in which valuable information is searched for from combinations of all horse numbers and all betting types, regardless of whether the horse numbers are selected or unselected by the user, betting tickets for buying targets with high payout amounts are searched for in the search scope, in accordance with a total purchase amount or a purchase estimate amount.

A search fee is increased in accordance with the extent of the search scope. For example, for the search scope (1), the search fee is ¥100, for the search scope (2), the search fee is ¥200, and for the search scope (3), the search fee is ¥300.

When the user does not need valuable information, he or she taps or clicks a button B9, and then, the terminal device 30 transmits valuable information unnecessary information to the betting ticket information provision server 10.

When the user taps or clicks a search button B10 for the search scope (1), the terminal device 30 transmits a request for the search scope (1) to the betting ticket information provision server 10. When the user taps or clicks a search button B11 for the search scope (2), the terminal device 30 transmits a request for the search scope (2) to the betting ticket information provision server 10. When the user taps or clicks a search button B12 for the search scope (3), the terminal device 30 transmits a request for the search scope (3) to the betting ticket information provision server 10.

When one of the search buttons B10 to B12 is tapped or clicked, and the betting ticket information provision server 10 receives a request for the search scope, it deducts a search fee (charge) in accordance with the search scope from the account DB 12c of the user.

Thus, the betting ticket information provision server 10 functions as an example of a reception means that further receives a charge for providing information on the betting ticket.

Next, the betting ticket information provision server 10 determines whether valuable information is required or not (step S4). Specifically, when the system control unit 14 receives valuable information unnecessary information from the terminal device 30, it determines that valuable information is not required. When the system control unit 14 receives a search scope request from the terminal device 30, it determines that valuable information is required.

When it is determined that valuable information is required (step S4; YES), the betting ticket information provision server 10 acquires odds information (step S5). Specifically, the system control unit 14 acquires current odds information corresponding to the race, referring to the race information DB 12a based on the race ID.

Thus, the betting ticket information provision server 10 functions as an example of an odds information acquisition means that acquires odds information on a race of the racing.

On the other hand, when it is determined that valuable information is not required (step S4; NO), a series of processing steps is terminated, and the betting ticket information provision server 10 deducts an amount of money in accordance with a purchase amount from the account DB 12c.

Next, the betting ticket information provision server 10 extracts a betting type (step S6). The system control unit 14 extracts a betting type different from the received betting type, referring to the betting type DB 12b. For example, for the search scope (1), when the system control unit 14 receives "quinella" as the betting type, it extracts "bracket quinella" or the like as a different betting type.

For the search scope (2), when the system control unit 14 receives "win" as the betting type, for example, it extracts "exacta," "trifecta," or the like as a different betting type. When receiving "exacta" as the betting type, the system control unit 14 extracts "win," "trifecta," or the like as a different betting type. When receiving "trifecta" as the betting type, the system control unit 14 extracts "win," "exacta," or the like as a different betting type. Incidentally, when receiving a betting type designating the order of racers, the system control unit 14 may extract a betting type of the same classification as a betting type. When receiving a betting type designating racers in no particular order, the system control unit 14 may extract a betting type of the same classification as a betting type.

For the search scope (3), the system control unit 14 extracts all betting types different from the received betting type.

Thus, the betting ticket information provision server 10 functions as an example of a betting type extraction means that extracts a betting type different from the received betting type from among betting types of a betting ticket designating the order of racers. Further, the betting ticket information provision server 10 functions as an example of a betting type extraction means that extracts a betting type different from the received betting type from among betting types of a betting ticket designating the racers. Further, the betting ticket information provision server 10 functions as an example of a betting type extraction means that extracts a betting type different from the received betting type, changing the range of extraction of the betting type from among betting types of a betting ticket designating racers, in accordance with the amount of a charge received by the reception means.

Next, the betting ticket information provision server 10 extracts a racer number pattern (step S7). Specifically, the system control unit 14 extracts a racer number pattern for an extracted betting type so as to cover all received racer number patterns.

For example, as shown in FIG. 15, for a received betting ticket of a win "5," for an extracted betting type "exacta," a wheel from an exacta "5," that is, when there are ten horses, all patterns necessarily including horse number "5" such as an exacta "5-1," an exacta "5-2," an exacta "5-3," an exacta "5-4," an exacta "5-6," an exacta "5-7," an exacta "5-8," an exacta "5-9," and an exacta "5-10" are extracted.

Figure 16:
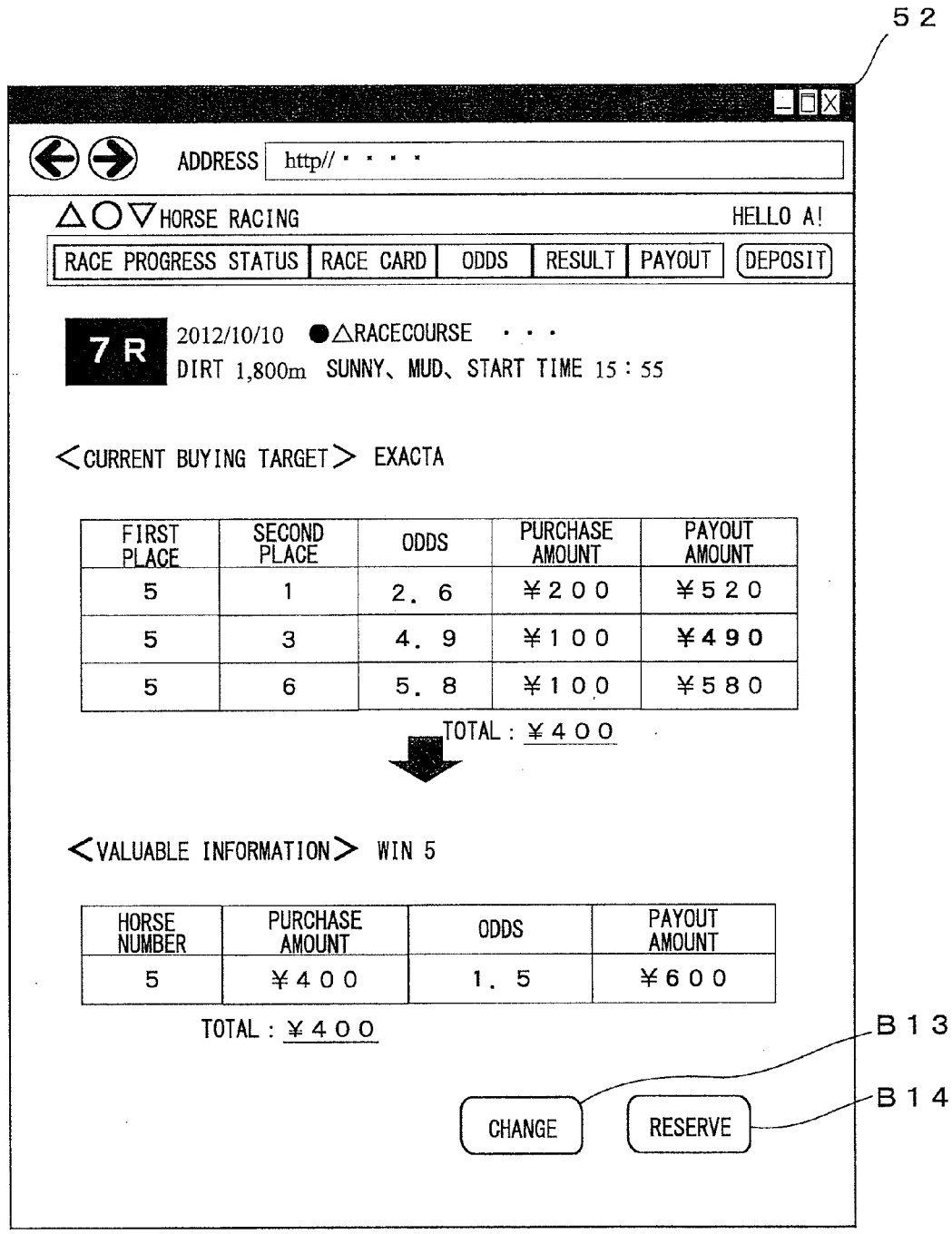
FIG. 16 is a schematic diagram illustrating an example of a valuable information webpage.

As shown in FIG. 16, for a received betting ticket of an exacta "5-1," an exacta "5-3," and an exacta "5-6," for an extracted betting type "win," a racer number pattern of a win "5" is extracted. That is, the favorite horse number "5" is necessarily included.

As shown in FIG. 17, for a received betting ticket of a trifecta "5-1-3" and a trifecta "5-1-4," for an extracted betting type "exacta," a racer number pattern of an exacta "5-1" is extracted. That is, a racer number pattern of a horse number predicted to finish first and a horse number predicted to finish second "5-1" is necessarily included.

As shown in FIG. 18, for a received betting ticket of an exacta "5-1," for an extracted betting type "trifecta," racer number patterns of a trifecta wheel from "5-1" are extracted. That is, a racer number pattern of a horse number predicted to finish first and a horse number predicted to finish second "5-1" is necessarily included.

As shown in FIG. 19, for a received betting ticket of a quinella "1-4," for an extracted betting type "bracket quinella," a racer number pattern of a bracket quinella "1-3" is extracted. When there are fifteen horses, a racer number pattern of a combination of horse number "1" and horse number "4" is necessarily included because horse number "1" is included in bracket number "1," and horse number "4" and horse number "5" are included in bracket number "3."

FIGS. 15 and 18 show cases where the number of buying targets is increased, that is, the number of racer number patterns is increased. FIGS. 16 and 17 show cases where the number of buying targets is decreased, that is, the number of racer number patterns is decreased. FIG. 19 shows a case where the number of buying targets is neither increased nor decreased, that is, the number of racer number patterns is neither increased nor decreased.

Thus, the betting ticket information provision server 10 functions as an example of a racer number pattern extraction means that extracts a racer number pattern for the extracted betting type so as to cover all the received racer number patterns. Further, the betting ticket information provision server 10 functions as an example of a racer number pattern extraction means that extracts a racer number pattern of one or more racer numbers corresponding to racers in a betting type. Further, the betting ticket information provision server 10 functions as an example of a racer number pattern extraction means that extracts the racer number pattern so as to increase the racer number pattern in number. Further, the betting ticket information provision server 10 functions as an example of a racer number pattern extraction means that extracts the racer number pattern so as to decrease the racer number patterns in number.

Next, the betting ticket information provision server 10 calculates a payout amount (step S8). Specifically, the system control unit 14 refers to the race information DB 12a and reads odds information on each received betting ticket, that is, odds information corresponding to a received betting type and a received racer number pattern. Then, the system control unit 14 multiplies the value of odds in the read odds information by a received purchase amount of each betting ticket to calculate a payout amount for each received betting ticket (for example, as shown in FIGS. 15 to 19, a payout amount in a current buying target).

Thus, the betting ticket information provision server 10 serves as an example of a first payout amount calculation means that calculates one or more first payout amounts from the odds information corresponding to a betting type and a racer number pattern received by the reception means and a receipt amount received by the reception means.

Next, the betting ticket information provision server 10 determines whether an allotment amount satisfying a predetermined condition can be calculated or not (step S9). Specifically, the system control unit 14 refers to the race information DB 12a, and reads odds information on each extracted betting ticket, that is, odds information corresponding to an extracted betting type and an extracted racer number pattern. Then, the system control unit 14 sets an allotment amount allotted to each extracted betting ticket from an amount of money equal to a total amount of money that the user pays, an amount of money lower than the total amount of money, or an amount of money close to the total amount of money.

Here, FIGS. 15 to 19 show cases where the total of the allotment amount is less than or equal to the total of the receipt amount. FIGS. 15 and 16 show cases where the total of the allotment amount equals to the total of the receipt amount. FIGS. 17, 18, and 19 show cases where the total of the allotment amount is lower than the total of the receipt amount.

Incidentally, when allotment amounts are set, allotment amounts may be set so that an allotment amount is as high as possible for a betting ticket at low read odds. An amount of money close to a total amount of money may be an amount of money 10% higher than the total amount of money or an allowable amount of money set by a user.

Then, the system control unit 14 multiplies each set allotment amount by odds information on each extracted betting ticket to calculate a payout amount for each betting ticket. When the lowest payout amount of the calculated payout amount (an example of a second payout amount) is higher than the highest amount of the payout amount calculated in step S8 (an example of an amount of money related to the first payout amount), the system control unit 14 determines that an allotment amount satisfying the predetermined condition can be calculated. Incidentally, setting of an allotment amount may be changed for each purchase amount unit (for example, ¥100) to perform determination again. An example of an amount of money related to the first payout amount may be the average amount of the payout amounts calculated in step S8 or the lowest amount.

Thus, the betting ticket information provision server 10 functions as an example of an allotment amount calculation means that calculates an allotment amount allotted to the extracted racer number pattern so that the lowest second payout amount of one or more second payout amounts calculated from the odds information on the extracted betting type and the extracted racer number pattern becomes higher than an amount of money related to the calculated first payout amount.

Further, the betting ticket information provision server 10 functions as an example of an allotment amount calculation means that calculates the allotment amount so that the total of the allotment amount allotted to the extracted racer number pattern is less than or equal to the total of the received receipt amount. Further, the betting ticket information provision server 10 functions as an example of an allotment amount calculation means that calculates the allotment amount so that the total of the allotment amount allotted to the extracted racer number pattern becomes equal to the total of the received receipt amount, and the lowest second payout amount becomes higher than the calculated first payout amount. Further, the betting ticket information provision server 10 functions as an example of an allotment amount calculation means that calculates the allotment amount so that the total of the allotment amount allotted to the extracted racer number pattern is equal to the total of the received receipt amount, and the lowest second payout amount becomes higher than the highest first payout amount of the calculated one or more first payout amounts. Further, the betting ticket information provision server 10 functions as an example of an allotment amount calculation means that calculates the allotment amount so that the total of the allotment amount allotted to the extracted racer number pattern becomes lower than the total of the received receipt amount, and the lowest second payout amount becomes higher than the highest first payout amount of the calculated one or more first payout amounts.

When an allotment amount satisfying a predetermined condition can be calculated (step S9; YES), the betting ticket information provision server 10 outputs a betting type, a racer number pattern, and an allotment amount (step S10). Specifically, the system control unit 14 transmits to the terminal device 30 an extracted betting type, an extracted racer number pattern, and a calculated allotment amount.

The terminal device 30 receives the output from the betting ticket information provision server 10, and as shown in FIGS. 15 to 19, displays one of the webpages 51 to 55 on which the extracted betting type, the extracted racer number pattern, and the calculated allotment amount are displayed on the display unit 33. On the webpages 51 to 55, a change button B13 for changing to a betting ticket in valuable information and a reservation button B14 for reserving a change to a betting ticket in valuable information are displayed.

Thus, the betting ticket information provision server 10 functions as an example of an output means that outputs the extracted betting type, the extracted racer number pattern, and the calculated allotment amount only when the allotment amount calculation means calculates the allotment amount.

On the other hand, when an allotment amount satisfying a predetermined condition cannot be calculated (step S9; NO), the series of processing steps is terminated, and the betting ticket information provision server 10 deducts an amount of money in accordance with a purchase amount from the account DB 12c.

Next, the betting ticket information provision server 10 determines whether purchase is reserved or not (step S11). When the user taps or clicks the reservation button B14 on one of the webpages 51 to 55, the terminal device 30 transmits information on a reservation for a betting ticket changed to valuable information to the betting ticket information provision server 10. Then, the system control unit 14 determines that purchase is reserved (step S11; YES).

Thus, the betting ticket information provision server 10 functions as an example of a reservation means that receives a reservation of the purchase of either the betting type, racer number pattern, and receipt amount received by the reception means, or the betting type, racer number pattern, and allotment amount outputted from the output means.

On the other hand, when the user taps or clicks the change button B13 on one of the webpages 51 to 55, the terminal device 30 transmits information to the effect that a betting ticket changed to valuable information is accepted to the betting ticket information provision server 10. Then, the system control unit 14 determines that purchase is not reserved (step S11; NO). Then, the system control unit 14 terminates the series of processing steps, and the betting ticket information provision server 10 deducts an amount of money in accordance with a purchase amount from the account DB 12c.

When it is determined that purchase is reserved (step S11; YES), the betting ticket information provision server 10 performs reservation processing (step S12). Specifically, like in step S5, the system control unit 14 refers to the race information DB 12a, and acquires odds information a predetermined time (for example, 30 seconds) before the close of acceptance of betting tickets for the racing on the race. Based on the acquired odds information, the system control unit 14 performs processing in steps S6 to S9. In steps S6 and S7, the system control unit 14 extracts a new betting type and racer number pattern. Then, in step S9, when an allotment amount can be calculated, the system control unit 14 performs the purchase of a betting ticket, based on a betting ticket of a newly extracted betting type and racer number pattern, and an allotment amount allotted to the betting ticket.

Thus, the betting ticket information provision server 10 functions as an example of an odds information acquisition means that refers to the storage means and acquires the odds information a predetermined time before the close of acceptance of betting tickets in the racing. Further, the betting ticket information provision server 10 functions as an example of a purchase processing means that performs purchase processing by the calculated allotment amount only when the allotment amount calculation means calculates the allotment amount, based on the acquired odds information.

In step S9, when an allotment amount cannot be calculated, the system control unit 14 performs processing for the purchase procedure by on a betting ticket of a received buying target.

As above, according to this embodiment, information on a betting ticket with a high probability of obtaining a higher dividend while maintaining a prediction by a user can be provided because in a betting type different from a received betting type, a racer number pattern for the extracted betting type is extracted so as to cover all received racer number patterns, and only when a second payout amount for a betting ticket of the extracted betting type and racer number pattern is higher than an amount of money related to a first payout amount of the received betting ticket, information on the extracted betting ticket is outputted. Further, information that is not unfavorable to a user can be reliably provided because a racer number pattern for an extracted betting type is extracted so as to cover all received racer number patterns.

Further, information on a betting ticket with a high probability of obtaining a higher dividend while maintaining a prediction by a user can be provided even when an amount of money to be paid is lower, as shown in FIGS. 15 to 19, when an allotment amount is calculated so that the total of the allotment amount allotted to the extracted racer number pattern becomes less than or equal to the total of the received receipt amount, because information on a betting ticket in which the total of the allotment amount allotted to the extracted racer number pattern is less than or equal to the received receipt amount is outputted.

Further, information on a betting ticket with a high probability of obtaining a higher dividend while maintaining a prediction by a user at the same amount of money to be paid can be provided, as shown in FIG. 15, when racer number patterns are extracted so that the racer number pattern is increased in number, and allotment amounts are calculated so that the total of the allotment amounts allotted to the extracted racer number patterns is equal to the total of the received receipt amount, and the lowest second payout amount becomes higher than the calculated first payout amount, because information on a betting ticket in which the total of the allotment amounts allotted to the extracted racer number patters equals to the total of the received receipt amount, and the lowest second payout amount is higher than the first payout amount of the received betting ticket is outputted.

Further, information on a betting ticket with a high probability of increasing a payout amount at the same amount of money to be paid and a high probability of obtaining a higher dividend while maintaining a prediction by a user can be provided, as shown in FIG. 16, when a racer number pattern is extracted so that the number of racer number patterns is decreased, and an allotment amount is calculated so that the total allotment amount allotted to the extracted racer number pattern is equal to the total of the received receipt amount, and the lowest second payout amount becomes higher than the highest first payout amount of calculated one or more first payout amounts, because information on a betting ticket in which the total allotment amount allotted to the extracted racer number pattern equals to the total of the received receipt amount, and the lowest second payout amount is higher than the highest amount of the first payout amounts of the received betting ticket is outputted.

Further, information on a betting ticket with a high probability of increasing a payout amount even at a lower amount of money to be paid and a high probability of obtaining a higher dividend while maintaining a prediction by a user can be provided, as shown in FIGS. 17, 18, and 19, when an allotment amount is calculated so that the total of the allotment amount allotted to the extracted racer number pattern becomes lower than the total of the received receipt amount, and the lowest second payout amount becomes higher than the highest first payout amount of calculated one or more first payout amounts, because information on a betting ticket in which the total of the allotment amount allotted to the extracted racer number pattern is lower than the total of the received receipt amount, and the lowest second payout amount is higher than the highest amount of the first payout amount of the received betting ticket is outputted.

Further, as shown in FIG. 14, when a charge for providing information on a betting ticket is further received, the range of extraction of the betting type from among betting types of a betting ticket to bet on a racer is changed in accordance with the amount of the received charge, and a betting type different from a received betting type is extracted, because the extraction range is changed in accordance with the amount of the received charge, processing load can be reduced due to the limited extraction range and also a restraining effect by charging.

Further, as shown in FIGS. 15 to 19, in the case where odds information on a race in a racing is successively stored in a storage means (for example, race information DB 12a), a reservation of purchase of either a received betting type, racer number pattern, and receipt amount, or a outputted betting type, racer number pattern, and allotment amount is received by the reservation button B14, odds information a predetermined time before the close of acceptance of betting tickets for the racing event is acquired by referring to the storage means, and only when an allotment amount is calculated, based on the acquired odds information, purchase processing by the calculated allotment amount is performed, although it is not determined which of a betting ticket received from a user and an extracted betting ticket is more favorable when there is time until the close of acceptance because there is time until the odds are fixed, the system, upon receiving the purchase reservation, automatically determines which is more favorable immediately before the close, thereby eliminating the need for the user to monitor it. Further, when a payout amount of an extracted betting ticket becomes unfavorable due to a change in odds, purchase can be prevented.

Further, as shown in FIG. 19, odds information on a race in a racing is acquired, a betting type of a betting ticket designating one or more racers out of racers to participate in a race, a racer number pattern of one or more racer numbers corresponding to racers in the betting type, and a receipt amount received for the racer number pattern are received from a user, a betting type different from the received betting type is extracted from among betting types of the betting ticket designating the racer, a racer number pattern for the extracted betting type is extracted so as to cover all received entire racer number pattern, one or more first payout amounts are calculated from odds information corresponding to the received betting type and racer number pattern and the received receipt amount, an allotment amount to be allotted to the extracted racer number pattern is calculated so that the lowest second payout amount of one or more second payout amounts calculated from the odds information on the extracted betting type and the extracted racer number pattern becomes higher than an amount of money related to the calculated first payout amount, the extracted betting type, the extracted racer number pattern, and the calculated allotment amounts are outputted only when an allotment amount is calculated, in which the allotment amount may be calculated so that the total of the allotment amount allotted to the extracted racer number pattern becomes lower than the total of the received receipt amount, and the lowest second payout amount becomes higher than the highest first payout amount of the calculated one or more first payout amounts.

Conventionally, for a betting ticket to be purchased by a user, it has been impossible to provide information on a betting ticket requiring lower funds (lower than the total received receipt amount) and having a high probability of obtaining a higher dividend while maintaining a prediction by the user.

According to this embodiment, in a betting type different from a received betting type, a racer number pattern for the extracted betting type is extracted so as to cover all received racer number patterns, and information on a betting ticket in which the total of allotment amount allotted to the extracted racer number pattern is lower than the total of the received receipt amount and the lowest second payout amount is higher than the highest amount of the first payout amount of the received betting ticket is outputted, so that it is possible to provide information on a betting ticket increasing the probability of a higher payout amount even at an amount of money to be paid lower than the received amount of money, and having a high probability of obtaining a higher dividend while maintaining a prediction by the user.

Incidentally, the terminal device 30 may acquire odds information from the betting ticket information provision server 10 and perform processing in steps S1 to S12.

As in step S1, the terminal device 30 receives a betting type from the operating unit 34, as in step S2, the terminal device 30 receives a racer number pattern from the operating unit 34, and as in step S2, the terminal device 30 receives a purchase amount from the operating unit 34.

Then, as in step S4, the terminal device 30 determines whether valuable information is required or not, based on an input from the operating unit 34. As in step S5, the terminal device 30 acquires odds information from the betting ticket information provision server 10.

As in step S6, the terminal device 30 extracts a betting type, as in step S7, the terminal device 30 extracts a racer number pattern, and as in step S8, the terminal device 30 calculates a payout amount.

Next, as in step S9, the terminal device 30 determines whether an allotment amount satisfying a predetermined condition can be calculated or not. When the allotment amount can be calculated, as in step S10, the terminal device 30 outputs the betting type, the racer number pattern, and the allotment amount to the display unit 33.

Next, as in step S11, the terminal device 30 determines whether purchase is reserved or not. When performing reservation processing, the terminal device 30 acquires the latest odds information from the betting ticket information provision server 10 until just before a close, and as in step S12, the terminal device 30 performs reservation processing, and transmits reservation determination information to the betting ticket information provision server 10 when a condition is satisfied.

The terminal device 30 performing the series of processing steps by the betting ticket information provision server 10 can provide similar effects.

Further, the present invention is not limited to the above embodiment. The above embodiment is illustrative, and anything having components substantially identical to the technical idea described in the claims of the present invention and providing similar functions and effects is included in the technical scope of the present invention.

EXPLANATION OF REFERENCE NUMERALS 1 betting ticket information provision system
10 betting ticket information provision server (betting ticket information provision device)
12a race information DB (storage means)
12b betting type DB
12c account DB
30 terminal device (betting ticket information provision device)

The invention claimed is:

1. A betting ticket information provision device for providing information on a betting ticket for a racing, the device comprising:
at least one memory operable to store program code;
at least one processor operable to read the program code and operate as instructed by the program code, the program code including:
reception code configured to cause the at least one processor to receive from a user a betting type showing a type of a betting ticket to bet on a racer to participate in a race of the racing, among betting types each being predetermined in a designation number of designating the racer by a racer number representing the racer, a racer number pattern of the one or more racer numbers in the designation number in the betting type, and a receipt amount received for each of the racer number patterns;
racer number pattern extraction code configured to cause the at least one processor to extract another racer number pattern in another betting type different in the designation number from the betting type received by the reception code, the other racer number pattern ensuring a win when a result of the race is fixed in an order of arrival in which any of the racer number patterns wins;
first payout estimate amount calculation code configured to cause the at least one processor to calculate a payout estimate amount from the odds information on the race corresponding to the racer number pattern in the betting type received by the reception code, and the receipt amount received by the reception code, and calculate a first payout estimate amount as a highest amount;
allotment amount calculation code configured to cause the at least one processor to calculate an allotment amount to be allotted to the other racer number pattern in the other betting type, wherein calculation of the allotment amount is performed so that a lowest second payout estimate amount of one or more payout estimate amounts calculated from the odds information on the other racer number pattern becomes higher than or equal to an amount of money related to the first payout estimate amount, and the total of the amount of money allotted to the other racer number pattern becomes lower than the total of the receipt amount; and
output code configured to cause the at least one processor to output the other betting type, the other racer number pattern, and the calculated allotment amount when the allotment amount is calculated by the allotment amount calculation code.

2. The betting ticket information provision device according to claim 1, wherein the racer number pattern extraction causes the at least one processor to extract the other racer number pattern in the other betting type that is larger in the designation number than the betting type received by the reception code.

3. The betting ticket information provision device according to claim 2, wherein the extracted other racer number pattern includes all the racer numbers of the racer number pattern received by the reception code.

4. The betting ticket information provision device according to claim 1, wherein the racer number pattern extraction code causes the at least one processor to extract the other racer number patter in the other betting type that is smaller in the designation number than the betting type received by the reception code.

5. The betting ticket information provision device according to claim 4, wherein the extracted other racer number pattern includes all the racer numbers common in the racer number patterns received by the reception code.

6. The betting ticket information provision device according to claim 1, wherein the amount of money related to the first payout estimate amount is the first payout estimate amount.

7. The betting ticket information provision device according to claim 1, wherein
the reception code causes the at least one processor to receive charge for providing information on the betting ticket; and
the betting type extraction code causes the at least one processor to change a range of extraction of the betting type from among betting types of the betting ticket designating the racer, in accordance with the amount of the charge received by the reception code, and extract a betting type different from the received betting type.

8. The betting ticket information provision device according to claim 1, further comprising:
odds information storage code configured to cause the at least one processor to successively store in a storage odds information on a race of the racing;
reservation code configured to cause the at least one processor to receive a reservation of purchase of either the betting type, racer number pattern, and receipt amount received by the reception code, or the betting type, racer number pattern, and allotment amount outputted by the output code; and purchase processing code configured to cause the at least one processor to perform purchase processing by the calculated allotment amount only when the allotment amount is calculated by the allotment amount calculation code, based on the acquired odds information, wherein the odds information acquisition code causes the at least one processor to refer to the storage and acquire the odds information a predetermined time before a time when acceptance of betting tickets for the racing is closed.

9. A betting ticket information provision method performed by a betting ticket information provision device that provides information on a betting ticket for a racing, the method comprising:

receiving, by the betting ticket information provision device, from a user a betting type showing a type of a betting ticket to bet on a racer to participate in a race of the racing, among betting types each being predetermined in a designation number of designating the racer by a racer number representing the racer, a racer number pattern of one or more racer numbers in the designation number corresponding to one or more racers in the betting type, and a receipt amount received for each of the racer number patterns;

extracting, by the betting ticket information provision device, another racer number pattern in another betting type different in the designation number from the received betting type, the other racer number pattern ensuring a win when a result of the race is fixed in an order of arrival in which any of the racer number patterns wins;

calculating, by the betting ticket information provision device, a payout estimate amount from the odds information on the race corresponding to the racer number pattern in the received betting type, and the received receipt amount, and calculating, by the betting ticket information provision device, a first payout estimate amount as a highest amount;

calculating, by the betting ticket information provision device, an allotment amount to be allotted to the other racer number pattern in the other betting type, wherein calculation is performed so that a lowest second payout estimate amount of one or more payout estimate amounts calculated from the odds information on the other racer number pattern becomes higher than or equal to an amount of money related to the first payout estimate amount, and the total of the amount of money allotted to the other racer number pattern becomes lower than the total of the receipt amount; and outputting, by the betting ticket information provision device, the other betting type, the other racer number pattern, and the calculated allotment amount when the allotment amount is calculated.

\* \* \* \* \*